US012775300B2

(12) United States Patent
Parmigiani et al.

(10) Patent No.: US 12,775,300 B2
(45) Date of Patent: Oct. 27, 2026

(54) OPTICAL VECTOR MULTIPLIER

(71) Applicant: Microsoft Technology Licensing, LLC, Redmond, WA (US)

(72) Inventors: Francesca Parmigiani, Cambridge (GB); Christos Gkantsidis, Cambridge (GB); István Haller, Cambridge (GB); Hitesh Ballani, Cambridge (GB); Antony Ian Taylor Rowstron, Cambridge (GB); Andrey Rybalchenko, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 676 days.

(21) Appl. No.: 18/262,749

(22) PCT Filed: Jan. 28, 2022

(86) PCT No.: PCT/US2022/014174
§ 371 (c)(1),
(2) Date: Jul. 25, 2023

(87) PCT Pub. No.: WO2022/169672
PCT Pub. Date: Aug. 11, 2022

(65) Prior Publication Data
US 2024/0427840 A1 Dec. 26, 2024

(30) Foreign Application Priority Data
Feb. 5, 2021 (EP) .................................... 21155428

(51) Int. Cl.
*G06E 3/00* (2006.01)

(52) U.S. Cl.
CPC .................................... *G06E 3/008* (2013.01)

(58) Field of Classification Search
CPC ...................................................... G06E 3/008
(Continued)

(56) References Cited

U.S. PATENT DOCUMENTS 5,784,309 A * 7/1998 Budil ...................... G06E 1/045 708/835
7,877,333 B2 1/2011 Macready
(Continued)

FOREIGN PATENT DOCUMENTS

CN 111561953 A 8/2020
CN 114514490 A 5/2022
(Continued)

OTHER PUBLICATIONS

Spall et al., "Fully reconfigurable coherent optical vector-matrix multiplication", Optics Letters, vol. 45, No. 20, Oct. 15, 2020 (Year: 2020).*
(Continued)

*Primary Examiner* — Tsu-Chang Lee
(74) *Attorney, Agent, or Firm* — Alleman Hall LLP

(57) ABSTRACT

Apparatus for performing vector-by-vector multiplication in an optical domain, comprising: a plurality of light signal generators, each arranged to emit a beam of light having a different respective carrier wavelength modulated with an input signal modelling a respective variable of a vector of variables; one or more sets of light modulator elements, wherein each light modulator element in each set is arranged to receive the beam of light modulated with a different one of said input signals, and apply a corresponding weight from a vector of weights in order to produce a weighted optical signal; a respective photosensor element for each of said sets; and one or more optical combining elements arranged to direct the weighted optical signals of each set onto the respective photosensor element and thereby produce a respective output in the form of an analogue electronic signal summing the weighted optical signals of the respective set.

14 Claims, 10 Drawing Sheets

(58) Field of Classification Search
USPC .......................................................... 706/19
See application file for complete search history.

(56) References Cited

U.S. PATENT DOCUMENTS

| | | | | |
|---|---|---|---|---|
| 8,027,587 | B1 * | 9/2011 | Watts ................ | G02B 6/12007 359/107 |
| 9,830,555 | B2 | 11/2017 | Marandi et al. | |
| 10,069,573 | B2 | 9/2018 | Krovi et al. | |
| 10,274,989 | B2 * | 4/2019 | Andregg ................ | G06E 3/008 |
| 10,671,937 | B2 | 6/2020 | Yarkoni et al. | |
| 10,691,771 | B2 | 6/2020 | Venturelli et al. | |
| 2018/0107237 | A1 | 4/2018 | Andregg et al. | |
| 2019/0019100 | A1 | 1/2019 | Roques-carmes et al. | |
| 2020/0074279 | A1 | 3/2020 | Koyama | |
| 2020/0110992 | A1 | 4/2020 | Hosseinzadeh et al. | |
| 2020/0142441 | A1 | 5/2020 | Bunandar et al. | |
| 2020/0150345 | A1 | 5/2020 | Nahmias | |
| 2020/0379504 | A1 | 12/2020 | Carolan | |
| 2021/0036783 | A1 | 2/2021 | Bunandar et al. | |
| 2022/0027130 | A1 | 1/2022 | Kashmiri | |
| 2024/0104162 | A1 | 3/2024 | Parmigiani | |
| 2024/0427841 | A1 | 12/2024 | Parmigiani | |
| 2024/0428023 | A1 | 12/2024 | Gladrow | |
| 2026/0017507 | A1 | 1/2026 | Parmigiani | |

FOREIGN PATENT DOCUMENTS

| | | | |
|---|---|---|---|
| JP | S60204076 | A | 10/1985 |
| JP | S6388531 | A | 4/1988 |
| JP | 2018147225 | A | 9/2018 |
| JP | 2022543366 | A | 10/2022 |
| KR | 20220039775 | A | 3/2022 |
| WO | 2007113727 | A2 | 10/2007 |
| WO | 2017047666 | A1 | 3/2017 |
| WO | 2019078354 | A1 | 4/2019 |
| WO | 2020205540 | A1 | 10/2020 |
| WO | 2021021787 | A1 | 2/2021 |

OTHER PUBLICATIONS

Tait et al., "Neuromorphic photonic networks using silicon photonic weight banks", Scientific reports, 7:7430, Aug. 7, 2017 (Year: 2017).*

Notice of Reasons for Refusal Received for Japanese Application No. 2023-541004, mailed on Oct. 30, 2025, 14 pages.

Notice Of Refusal Received for Japan Application No. 2023-547509, mailed on Dec. 3, 2025, 06 pages.

First Examination Report Received for Indian Application No. 202317051037, mailed on Feb. 17, 2026, 07 Pages. (English Translation Provided).

Notice of Allowance received for Chinese Application No. 202280013650.2, mailed on Jan. 23, 2026, 07 pages. (English translation Provided).

"Lightmatter", Retrieved from: https://lightmatter.co/, Retrieved Date: May 26, 2023, 11 Pages.

"Mythic", Retrieved from: https://mythic.ai/, Retrieved Date: May 26, 2023, 3 Pages.

Bai, et al., "Deep equilibrium models", In Proceedings of 33rd Conference on Neural Information Processing Systems, Dec. 8, 2019, pp. 1-12.

Bansal, et al., "Cold Diffusion: Inverting Arbitrary Image Transforms Without Noise", arXiv:2208.09392v1, Aug. 19, 2022, 22 pages.

Bohm, et al., "Noise-injected analog Ising machines enable ultrafast statistical sampling and machine learning", Nature Communications, vol. 13, Oct. 4, 2022, pp. 1-13.

Decision to Grant received for Japanese Application No. 2023-541004, mailed on Feb. 2, 2026, 5 pages. (English Translation Provided).

International Preliminary Report on Patentability (Chapter I) received for PCT Application No. PCT/US2024/034570, mailed on Jan. 2, 2026, 06 pages.

International Search Report and Written Opinion received for PCT Application No. PCT/US2024/034570, mailed on Oct. 4, 2024, 11 pages.

International Search Report and Written Opinion received for PCT Application No. PCT/US2025/030086, mailed on Jul. 16, 2025, 13 pages.

Notice of Reasons for Refusal Received for Japanese Application No. 2023-547507, mailed on Dec. 15, 2025, 10 pages. (English Translation Provided).

Radhakrishnan, et al., "Overparameterized neural networks implement associative memory", In Proceedings of the National Academy of Sciences, vol. 117, Issue 44, Nov. 3, 2020, pp. 27162-27170.

Saxena, et al., "The Surprising Effectiveness of Diffusion Models for Optical Flow and Monocular Depth Estimation", arXiv:2306.01923v2, Dec. 6, 2023, 27 pages.

Sullivan, Richard, "Our technology will close the gap between today's AI and tomorrow's artificial brains.", Retrieved from: https://rain.ai/about-us, Retrieved Date: Jun. 24, 2023, 10 Pages.

Sullivan, Richard, "Rain", Retrieved from: https://rain.ai/, Retrieved Date: Jun. 24, 2023, 5 Pages.

Yang, et al., "Resistive Memory-based Neural Differential Equation Solver for Score-based Diffusion Model", arXiv:2404.05648v1, Apr. 8, 2024, 14 pages.

Decision to Grant Received for Japan Application No. 2023-547509, mailed on Apr. 3, 2026, 05 pages. (English Translation Provided).

Decision to Grant received for Japanese Application No. 2023-547507, mailed on Mar. 30, 2026, 05 Pages. (English Translation Provided).

First Office Action Received for Chinese Application No. 202280013650.2, mailed on Jul. 22, 2025, 12 pages. (English translation Provided).

Communication pursuant to Article 94(3) received for European Application No. 22704475.7, mailed on Mar. 4, 2026, 08 Pages.

Tezak, et al., "Integrated Coherent Ising Machines Based on Self-Phase Modulation in Microring Resonators", In Journal of IEEE Selected Topics in Quantum Electronics, vol. 26, No. 1, Jan. 1, 2020, pp. 1-16.

"Wavelength Selective Switch", Retrieved From: https://www.slideshare.net/MeiLee31/jdc-technique-intro, Retrieved On: Jan. 29, 2021, 1 Page.

"Extended European Search Report Issued in Application No. 21155428.2", Mailed Date: Jul. 21, 2021, 8 Pages.

"Extended European Search Report Issued in Application No. 21155439.9", Mailed Date: Jul. 23, 2021, 9 Pages.

"Extended European Search Report Issued in Application No. 21155447.2", Mailed Date: Aug. 11, 2021, 10 Pages.

Bohm, et al., "A Poor Man's Coherent Ising Machine based on Opto-Electronic Feedback Systems for Solving Optimization Problems", In Journal of Nature Communications, vol. 10, Issue 1, Aug. 8, 2019, pp. 1-9.

Clements, et al., "Optimal Design for Universal Multiport Interferometers", In Journal of Optica, vol. 3, Issue 12, Dec. 6, 2016, pp. 1460-1465.

Gokmen, et al., "Acceleration of Deep Neural Network Training with Resistive Cross-Point Devices: Design Considerations", In Journal of Frontiers in Neuroscience, vol. 10, Article 333, Jul. 21, 2016, pp. 1-13.

Gruber, et al., "Planar-Integrated Optical Vector-Matrix Multiplier", In Journal of Applied Optics, vol. 39, Issue 29, Oct. 10, 2000, pp. 5367-5373.

Hernandez, et al., "A Quantum-Inspired Method for Three-Dimensional Ligand-Based Virtual Screening", In Journal of Chemical Information and Modeling, vol. 59, Issue 10, Oct. 18, 2019, 11 Pages.

Hernandez, et al., "Enhancing Quantum Annealing Performance for the Molecular Similarity Problem", In Journal of Quantum Information Processing, vol. 16, Issue 5, Apr. 9, 2017, pp. 1-27.

(56) References Cited

OTHER PUBLICATIONS

Inagaki, et al., "A Coherent Ising Machine for 2000-Node Optimization Problems", In Journal of Science, vol. 354, Issue 6312, Nov. 4, 2016, pp. 603-606.
Kalinin, et al., "Complexity Continuum within Ising Formulation of NP Problems", In Repository of arXiv:2008.00466v1, Aug. 2, 2020, 11 Pages.
Kitayama, et al., "Novel Frontier of Photonics for Data Processing-Photonic Accelerator", In Journal of APL Photonics, vol. 4, Issue 9, Sep. 24, 2019, 25 Pages.
Marandi, et al., "Network of Time-Multiplexed Optical Parametric Oscillators as a coherent Ising Machine", In Journal of Nature Photonics, vol. 8, Issue 12, Dec. 2014, pp. 937-942.
Matsuda, Yoshiki, "Benchmarking the MAX-CUT problem on the Simulated Bifurcation Machine", Retrieved from: https://medium.com/toshiba-sbm/benchmarking-the-max-cut-problem-on-the-simulated-bifurcation-machine-e26e1127c0b0, Sep. 30, 2019, 17 Pages.
Nahmias, et al., "Photonic Multiply-Accumulate Operations for Neural Networks", In IEEE Journal of Selected Topics in Quantum Electronics, vol. 26, Issue 1, Jan. 2020, 18 Pages.
Park, et al., "Optimization for Artificial Neural Network with Adaptive Inertial Weight of Particle Swarm Optimization", In Proceedings of 8th IEEE International Conference on Cognitive Informatics, Jun. 15, 2009, pp. 481-485.
"International Search Report and Written Opinion Issued in PCT Application No. PCT/US22/014172", Mailed Date: Jun. 20, 2022, 15 Pages.
"International Search Report and Written Opinion Issued in PCT Application No. PCT/US22/014173", Mailed Date: May 27, 2022, 14 Pages.
"International Search Report and Written Opinion Issued in PCT Application No. PCT/US22/014174", Mailed Date: May 24, 2022, 14 Pages.
Reck, et al., "Experimental Realization of any Discrete Unitary Operator", In Journal of Physical Review Letters, vol. 73, Issue 1, Jul. 4, 1994, pp. 58-61.
Roques-Carmes, et al., "Heuristic Recurrent Algorithms for Photonic Ising Machines", In Repository of arXiv:1811.02705v3, Nov. 19, 2019, pp. 1-44.
Roques-Carmes, et al., "Photonic Recurrent Ising Sampler", In Repository of arXiv:1811.02705v1, Nov. 7, 2018, 29 Pages.
Russell, John, "Optalysys Optical Co-processor Hits Milestone with GENESYS Project", Retrieved from: https://www.hpcwire.com/2018/02/12/optalysys-optical-co-processor-hits-milestone-genesys-project/, Feb. 12, 2018, 16 Pages.
Shastri, et al., "Photonics for Artificial Intelligence and Neuromorphic Computing", In Repository of arXiv:2011.00111v1, Oct. 30, 2020, pp. 1-26.
Shen, et al., "Deep Learning with Coherent Nanophotonic Circuits", In Journal of Nature Photonics, vol. 11, Issue 7, Jun. 12, 2017, pp. 441-446.
Spall, et al., "Fully Reconfigurable Coherent Optical Vector-Matrix Multiplication", In Journal of Optics Letters, vol. 45, Issue 20, Oct. 15, 2020, pp. 5752-5755.
Tait, et al., "Neuromorphic Photonic Networks using Silicon Photonic Weight Banks", In Journal of Scientific Reports, vol. 7, Issue 1, Aug. 7, 2017, pp. 1-10.
Takata, et al., "A 16-bit Coherent Ising Machine for One-Dimensional Ring and Cubic Graph Problems", In Journal of Scientific Reports, vol. 6, Issue 1, Sep. 23, 2016, pp. 1-7.
Tezak, et al., "Integrated Coherent Ising Machines Based on Self-Phase Modulation in Microring Resonators", In Journal of Selected Topics in Quantum Electronics, vol. 26, Issue 1, Jan. 2020, 15 Pages.
First Examination Report Received for Indian Application No. 202317051038, mailed on May 12, 2026, 09 pages.
Non-Final office Action mailed on May 28, 2026, in U.S. Appl. No. 18/262,782, 18 Pages.
Aoyama, et al., "Optical demultiplexer for a wavelength division multiplexing system", Applied Optics, vol. 18, No. 08, 1979, pp. 1253-1258.
Communication pursuant to Article 94(3) received for European Application No. 22704476.5, mailed on Jun. 11, 2026, 09 Pages.
Szoplik, et al., "Optical-digital processors for morphological and rank order filtering", Optics & Laser Technology, vol. 28, No. 02, Mar. 1996, pp. 73-82.
Communication under Rule 71(3) received for European Application No. 22704475.7, mailed on Jun. 15, 2026, 07 Pages.

* cited by examiner

OPTICAL VECTOR MULTIPLIER

BACKGROUND

Many problems in logistics, financial portfolio management, drug discovery, and other application domains require finding an assignment of values to their inputs (typically called variables) with the goal of optimizing an objective. For instance, such problems include "combinatorial optimization problems". Unlike other areas of optimization, combinatorial optimization relates to problems where variables take values from a finite set. For example, valid assignments could be binary (e.g. whether to make an investment or not), from a limited set (e.g. one of three available routes to pick), or, in general from a finite subset of the integers. In such problems, there is a finite set of ways for combining the values of each variable. In principle, it is possible to enumerate all possible combinations and find the optimal assignment. In practice, however, such exhaustive search is infeasible for problems of even moderate sizes, as the set of combinations is extremely large (exponential in the number of variables).

There has been extensive work towards understanding the structure of such problems. A subset of combinatorial optimization problems belongs to the category of problems known as NP-complete (where NP stands for nondeterministic polynomial). NP-completeness is a concept known in computational complexity theory, and all NP-complete problems can be transformed into any other NP-complete problem. An efficient solver for any NP-complete problem implies that any NP-complete problem can be solved efficiently. All NP-complete problems also belong to a larger subset of problems known as 'NP-hard', where all NP-hard problems can also be transformed into all other NP-hard problems.

The term "efficient" in this setting means finding a solution to the problem without enumerating all possibilities. Specifically, an efficient solution to a graph optimization described herein is a solution whereby the amount of time taken to find the solution scales polynomially with the number of variables of the problem (such as graph vertices), whereas enumerating all possible solutions is exponential with the number of variables of the problem. However, it is widely accepted that no such efficient solver can ever exist. Instead, work in this area has focused on devising algorithms that find solutions that are "good enough"; often there are no assurances that such approximation algorithms will indeed provide an answer which is close enough to the exact solution.

A variety of combinatorial optimization problems exist, and, as described above, NP-complete problems may be transformed to other NP-complete problems. For example, the traveling salesman problem is defined as follows: for a given set of cities and pairwise distances between cities, the problem is to find a path via all the cities, wherein each city is visited exactly once, such that the path has the shortest total length.

A general form of combinatorial optimization problem can be defined called quadratic unconstrained binary optimization (QUBO) problems, which are defined by a set of binary variables $V=\{v_1, v_2, \ldots v_N\}$, each taking a value of either 0 or 1, and a formula $\Sigma_i\Sigma_j Q_{ij}\cdot v_i\cdot v_j$, where the coefficient $Q_{ij}$ defines the interaction between variable $v_1$ and $v_j$. The travelling salesman problem can be formulated as a QUBO problem, by defining variables as positions in the path between each city for each possible city to be visited (for example, the first variable may indicate whether or not London is the first city visited), and with the distances between cities encoded in the matrix Q, such that the total distance is minimised subject to the constraint that all cities are visited exactly once. QUBO is a type of polynomial unconstrained binary optimization (PUBO) problem, which assigns values to a set of binary variables $V=\{v_1, v_2, \ldots, v_N\}$ so as to minimise a formula $\Sigma_{v' \subseteq V} Q_{V'} \cdot \Pi_{v \in V'} v$, where in this case, the coefficients Q may encode interactions between any number of variables. As mentioned above, it is possible to transform between different formulations of NP-hard problems. It is possible to transform PUBO problems to QUBO by introducing auxiliary variables and terms in the formula.

A formulation called the Ising model, used in physics to model ferromagnetism and other physical processes, is equivalent to the QUBO problem defined above. The Ising model is described in terms of a physical system with variables that can exist in two discrete states, where these variables can interact with each other, and the total energy of the system is given by $H(\sigma)=-\Sigma_{i,j}J_{ij}\sigma_i\sigma_j-\mu\Sigma_i h_i\sigma_i$. In the Ising formulation, the binary variables (sometimes referred to as 'spins') are typically assigned to one of +1/−1, rather than 1/0 or any other binary assignment. However, the Ising formulation can easily be mapped to the QUBO formulation for Boolean variables, by applying the formula: $\sigma_i=2v_i-1$.

Note that the notation used above is slightly different between the QUBO and the Ising formulation, with the variables to be assigned represented by 6 and the interaction coefficients represented by J for the Ising model. For simplicity, in this application the notation u will be used for variables to which values are assigned and J will be used to denote arrays of interaction coefficients in the context of an Ising solver. However, Q and v may also be used herein in general to denote a matrix of weights and a variable, respectively.

The second term $-\mu\Sigma_i h_i\sigma_i$ in the above expression for the total energy represents the effect of an external 'field' or some external effect on the system being modelled. For example, in a ferromagnetic material, the first term represents the energy contribution for interactions between magnetic dipoles, while the second term represents the energy of the system due to an external magnetic field. Many problems are modelled as Ising problems without external fields, as it is much simpler to solve the Ising problem in the case of no external field. However, it is possible to convert a problem with an external field to a problem without an external field by introducing an extra spin and additional edges with weights chosen carefully. Any problems or models referred to as Ising problems in the description below assume no external field, or a problem already converted to one with no external field.

Until recently, algorithms for combinatorial optimization have typically been implemented in digital hardware, such as commodity CPUs, FPGAs, GPUs, and ASICs. Digital hardware has great advantages with respect to flexibility (i.e. the ability to program different algorithms), and reliability. However, digital solutions are also limited by the speed of execution and power consumption. In the past, improved computational power and reduced consumption could be achieved for each generation of digital hardware. It is widely predicted that improving performance of digital hardware will be increasingly difficult, as fundamental physical limits are approached. Searching for better answers for combinatorial optimization problems or tackling larger instances of those will come at a greater hardware cost.

However, more recently, there have been attempts to solve such problems using hardware based on non-digital physical processes. A popular realization of the Ising model with a physical process uses quantum annealers. In existing systems, the problem variables are represented by quantum bits, taking values +1 and −1, usually referred to as "spins". However, this topology does not allow full connectivity. Instead, the qubits interconnect in an architecture comprising sets of connected unit cells, each with four horizontal qubits connected to four vertical qubits via couplers. Unit cells are tiled vertically and horizontally with adjacent qubits connected, creating a lattice of sparsely connected qubits. The limited connectivity of this architecture has undesirable implications, resulting in inefficient representations of the problem variables into the spins, i. e. the number of the quantum bits required for the physical system to represent the problem is much higher than the original variable number.

Due to this inherent physical limitation of the quantum annealers hardware, algorithms have been developed which can run in classical hardware and are inspired by the physical properties of Quantum. For example, Microsoft Azure has developed Quantum Inspired Optimization (QIO) algorithms, which have shown good promise to approximate PUBO problems.

In an optical solver, light signals are used to represent the input variables (e.g. $\sigma_{i=1 \ldots N}$ in the Ising problem), and an optical element is used to combine the signals in a way that models the interaction between the variables (e.g. the matrix J in the Ising problem). Optical elements that perform a vector-by-vector multiplication in the optical domain, such as a liquid crystal display or a ring-resonator, are known in the art. The summation (Σ) can be implemented using a photodetector that can perform coherent or incoherent addition of signals falling upon the photodetector's light sensing element.

In the cases where the inputs to the solver (i.e. the variables whose values are to be determined) can take binary positive and negative values, such as −1 and +1, or −½ and +½, then these are sometimes referred to as "spins" merely by analogy with the quantum property of spin. However in such a context, this does not actually mean the quantum property of spin. Instead the two possible "spin" values simply refer to two possible values of a binary variable, and could be represented using, for example, two different values of the amplitude, or phase, of the light.

State of the art solutions based or inspired in optics propose either digital approaches only (see Toshiba's Solving Traveling Salesman Problem with SBM [Simulated Bifurcation Machine], Ikuko Hasumi https://medium.com/toshiba-sbm/solving-traveling-salesman-problem-with-sbm-simulated-bifurcation-machine-89740c83ed37) or hybrid approaches, as per Bohm, Fabian, Guy Verschaffelt, and Guy Van der Sande. "A poor man's coherent Ising machine based on opto-electronic feedback systems for solving optimization problems." Nature communications 10.1 (2019): 1-9 (https://www.nature.com/articles/s41467-019-11484-3) and Inagaki, Takahiro, et al. "A coherent Ising machine for 2000-node optimization problems." Science 354.6312 (2016): 603-606 (https://science.sciencemag.org/content/354/6312/603).

In hybrid approaches, a building block to generate a signal representing the variable values is typically implemented in optical hardware, but the logic to compute the variable interactions is implemented using digital hardware and hardware to convert between optical and digital domains. By contrast, in 'all-analogue' solvers, non-digital hardware is instead used to convert a signal between optical (i.e. a light signal) and analogue electronic domains. An advantage of all-analogue solvers is the speed at which optical and analogue electronic signals can be transmitted (digital electronics are inherently much slower due to the need to clock sequences of bits through flip-flops). Whereas implementing part of the iteration in the digital domain defeats the point of an all-analogue solver, which is the speed of transmission compared to digital electronics. The speed of the system will be limited by the slowest part, so the inclusion of any digital electronics negates the benefit of optical solvers.

An all optical solution has been proposed and demonstrated with all-to-all connectivity for 4 spins/variables and partial connectivity for 16 spins/variables. (Marandi, A., Wang, Z., Takata, K., Byer, R. L. & Yamamoto, Y. Network of time-multiplexed optical parametric oscillators as a coherent Ising machine. Nat. Photonics 8, 937-942 (2014), K. Takata et al. "A 16-bit Coherent Ising Machine for One-Dimensional Ring and Cubic Graph Problems", Scientific Report 2016. A 16-bit Coherent Ising Machine for One-Dimensional Ring and Cubic Graph Problems (europepmc.org)).

State of the art all-optical solvers generate variables using optical signals in a time-division multiplexing architecture. I.e. the signals are multiplexed in series into the same beam of light, and a different delay path is introduced for each variable so that the signals can then be combined in order to model the interactions between the variables. However, for time-division multiplexing, because spin generation is carried out in series, the time complexity of the solver is linear in the number of variables being modelled. FIG. 5A shows a schematic block diagram of a time-division multiplexing architecture. For a time-division architecture, each of the 'spins' are generated in series, and delayed by different path lengths in order to be able to implement the interaction between them. This means that a single iteration must wait for all spins to be generated before computing the interaction between spins and passing the feedback to the spin generation.

Solvers which are implemented wholly in the analogue domain use optical or analogue electronic vector multipliers to model the 'spin' interactions of Ising systems. Implementing optical vector multipliers has the advantage pointed out above, that it leverages the speed of optical transmission.

SUMMARY

Existing technologies to perform vector multiplication in the optical domain using light signals include spatial light modulators (SLM), ring resonators and Mach-Zender interferometers (MZI). A challenge in designing an optical vector multiplier is in maximizing the speed and efficiency of the multiplication. Typically, multiplication of light signals is done by applying an optical element to alter the value of the input by a predetermined amount. This may be achieved, for example, by passing the input signal through a lossy element, with the intensity of the optical signal being reduced by a predetermined amount depending on the configuration of the optical element. Examples of optical elements used for this purpose include liquid crystal displays and ring resonators.

Some optical vector multipliers represent the input elements of the vector by modulated light signals of the same wavelength. A difficulty with this is that the resulting signal computing the vector multiplication of such as set of signals by an array of lossy elements is a single beam of light of a single wavelength. Since the light is all of one wavelength, to detect the correct value of the weighted sum, coherent addition of the weighted inputs must be performed. Spatial light modulators are used in this way, such that the result of the vector multiplication is obtained by coherent addition after modulating by the elements of the SLM. However, a difficulty with coherent addition is that the optical signals being added need to be phase-matched so that the electrical fields are added correctly. This is difficult to achieve at optical frequencies of the order of hundreds of THz for systems which may be configured to process hundreds of inputs.

Ring resonators on the other hand use wavelength-division multiplexing, which represents the input vector by a wavelength-multiplexed light signal comprising a unique wavelength carrier for each element of the input vector to be multiplied. Ring resonators are placed next to a waveguide to couple only the light of a specific wavelength. When the length of the ring circumference is equal to an integer number of wavelengths which is the resonance condition, the optical signal in the waveguide is dropped to the ring and lost due to the scattering. The levels of light intensity are considered as data values in analog form and multiplications are implemented by the ring resonators in which the loss rate can be controlled by injecting a charge into the ring or changing its temperature. However, a potential disadvantage of ring resonators is that the signal containing the full input vector passes through the series of ring resonators, which leads to losses during optical transmission.

Mach-Zender interferometers consist of two directional couplers (DCs) where two input signals are equally divided into two output ports and two phase shifters (PSs) that modulate the input signals. The MZI can distribute the light signal of each input port to the two output ports at an arbitrary ratio by adjusting the phase shift so that it can be used to implement a 2×2 unitary transformation. As in the case of ring resonators, optical vector multiplication suffers increasing system losses as the number of inputs to the system increases, with losses increasing linearly with the number of inputs as each input has to go through more devices.

By contrast, for an SLM, each individual signal only passes once through a single modulator of the SLM, which minimizes system losses, such that the loss is constant as the number of inputs increases. However, as noted above, existing SLMs are used with light sources of the same wavelength, which requires coherent addition.

It would therefore be desirable to provide an alternative form of apparatus for performing vector multiplication in the optical domain.

In a different field of technology, wavelength selective switch devices are currently used in telecommunication applications, typically to add or drop specific wavelengths from a signal at specific transmission nodes, and to guarantee that signals are flat across the transmitted spectrum. Wavelength selective switches are typically used with a single input fiber on one side, comprising signals of different wavelengths, which are dispersed by a dispersive element to reflect different wavelengths in different physical position, to an SLM which attenuates the signals based on their respective wavelengths. This is coupled to multiple output fibers on the other side for the attenuated signals of different wavelengths. This device is bi-directional.

Described herein is a wavelength selective switch configured to carry out optical vector multiplication on a set of input signals of different wavelengths. A spatial light modulator is used to apply a specific loss factor to each input signal at a different respective wavelength, while a diffraction element is used to combine the resulting weighted signal into one beam for detection at a photodetector to compute a weighted sum of the inputs. This benefits from the advantage of the spatial light modulator, which has minimal system losses since each signal is passed through a single cell, and the advantage of incoherent detection at the photodetector, since all the signals are of different wavelengths (within the bandwidth of the photodetector).

Optical elements such as lenslet arrays and diffraction elements may be configured to collimate and direct the signals more effectively, enabling the wavelength-selective switch to be scaled out to a larger number of input signals, and enabling the use of the wavelength selective switch as a vector multiplier, for example, in optical Ising solver architecture modelling a large number of spin variables (typically hundreds or thousands of spins). This provides an advantage over typical SLM implementations of optical vector multipliers using lenses, which cannot be scaled easily to large inputs.

A first aspect disclosed herein provides apparatus for performing vector-by-vector multiplication in an optical domain, the apparatus comprising: a plurality of light signal generators, each arranged to emit a respective beam of light having a different respective carrier wavelength modulated with a respective input signal modelling a respective variable of a vector of variables; one or more sets of light modulator elements, wherein within each set, each light modulator element in the set is arranged to receive the beam of light modulated with a different corresponding one of said input signals, and apply a corresponding weight from a vector of weights in order to produce a corresponding weighted optical signal; a respective photosensor element for each of said sets; and one or more optical combining elements arranged, for each of said sets, to direct the weighted optical signals of the set onto the respective photosensor element and thereby produce a respective output in the form of an analogue electronic signal summing the weighted optical signals of the respective set.

Another aspect disclosed herein provides a method for performing vector-by-vector multiplication in an optical domain, the method comprising: generating, by a plurality of light sources, a plurality of beams of light, each having a different respective carrier wavelength modulated with a respective input signal modelling a respective variable of a vector of variables; receiving each beam of light at one or more sets of light modulator elements; and for each set of light modulator elements: applying a weight from a vector of weights to each beam of light by a respective light modulator element to produce a respective weighted optical signal; and directing, by one or more optical combining elements, the weighted optical signal onto a respective photosensor element thereby producing a respective output in the form of an analogue electronic signal summing the weighted optical signals of the respective set.

BRIEF DESCRIPTION OF THE DRAWINGS

For a better understanding of the present disclosure, and to show how embodiments of the same may be put into effect, reference is made to the accompanying figures in which.

DETAILED DESCRIPTION

Figure 1:
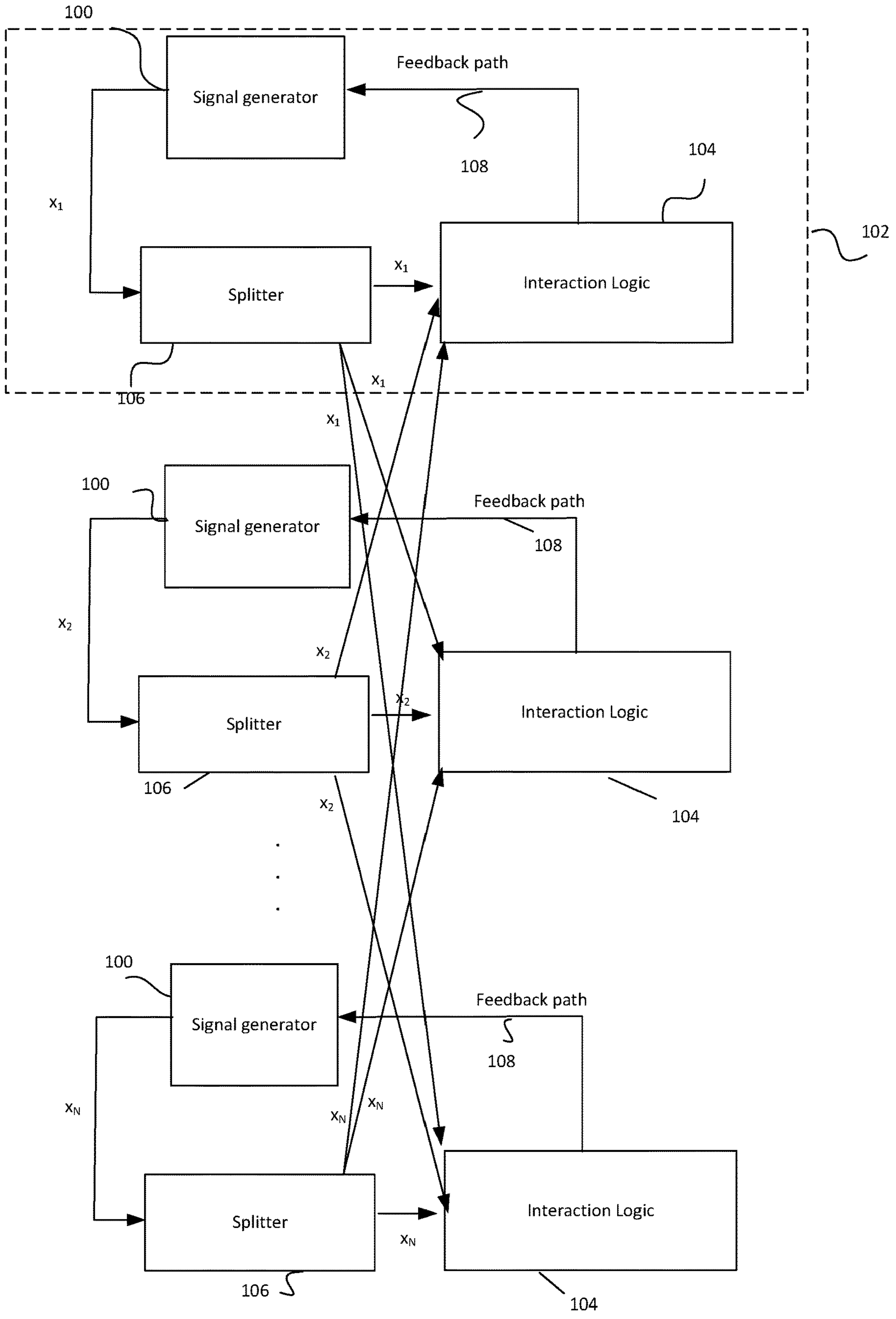
FIG. 1 shows a schematic block diagram of an example optical solver architecture for quadratic unconstrained binary optimization problems.

FIG. 1 shows a schematic block diagram of an optical solver architecture configured to solve combinatorial optimization problems. Note that 'solving' an optimization problem herein covers the possibility of finding an approximate solution. The following description will focus on problems which model interactions of two variables, such as the Ising problem described above. However, note that higher-order PUBO problems, which model interactions between three or more variables, can be transformed to QUBO problems, albeit with a higher number of variables, and use the same optical hardware to solve them. As described above, the goal of such problems is to find an assignment of variables that minimize a particular function specific to the problem. The function to be minimized in the optimization may be referred to herein as an 'energy' to reflect the total energy which takes this form in certain physical systems, such as the Ising model for ferromagnetism.

A general combinatorial optimisation problem can be solved by first mapping said problem to a QUBO problem, which can then be mapped to an Ising problem. For many problems, there is a known mapping to the QUBO formulation. For others, a mapping may have to be derived. The mapping of general NP-hard problems to a QUBO or Ising formulation is a topic that, in itself, will be understood by a person skilled in the art of mathematics. For example, a problem expressed in PUBO form, for example a cubic unconstrained binary optimization problem with the formula $\Sigma_{ijk} Q_{ijk} v_i v_j v_k$, may be expressed as a QUBO problem by introducing extra variables and terms, and may thus be solved by the Ising solver disclosed herein. The solver disclosed herein provides a solution to an Ising problem, which can be used solve any NP-hard problem for which a mapping to that problem can be found.

In doing this, the problem is mapped to a physical system whose total energy is given by the Ising Hamiltonian, i.e. $-\Sigma_{i,j} J_{ij}\sigma_i\sigma_j$ (assuming no external field). To map the given problem to an Ising system, the matrix J needs to be determined such that minimizing the total energy $-\Sigma_{i,j} J_{ij}\cdot\sigma_i\cdot\sigma_j$ (i.e. maximizing $\Sigma_{i,j} J_{ij}\cdot\sigma_i\sigma_j$) is equivalent to optimizing the problem.

The Hamiltonian is therefore a sum of a plurality of terms $J_{ij}\cdot\sigma_i\cdot\sigma_j$, each being a product of a respective subset of the variables $\sigma_i,\sigma_j$ with a corresponding weight $J_{ij}$. (so the first term is the subset of one variable $\sigma_1$ multiplied with itself and the weight $J_{11}$, and the second term is the subset $\sigma_1$, $\sigma_2$ multiplied together and with the weight $J_{12}$, etc.).

As can be seen, this sum can be broken down into a series of vector-by-vector (dot product) multiplications, by taking u, out to the left of the sum:

$$\sum_{i,j} J_{ij}\cdot\sigma_i\cdot\sigma_j = \sum_i \sigma_i \sum_j J_{ij}\cdot\sigma_j = \sum_i \sigma_i \begin{pmatrix} J_{i1} \\ \vdots \\ J_{iN} \end{pmatrix}\cdot(\sigma_1 \ \ \dots \ \ \sigma_N) = \sigma_1(\sigma_1 J_{11} + \sigma_2 J_{12} + \dots + \sigma_N J_{1N}) + \sigma_2(\sigma_1 J_{21} + \sigma_2 J_{22} + \dots + \sigma_N J_{2N}) \ \dots = \sigma_N(\sigma_1 J_{N1} + \sigma_2 J_{N2} + \dots + \sigma_{nN})$$

In this final representation, the sum in each line is an individual vector multiplication which represents a contribution of a different respective one of the variables $\sigma_i$ to the energy in the Hamiltonian. I.e. the vector multiplication $(\sigma_1 J_{11}+\sigma_2 J_{12}+ \dots +\sigma_N J_{1N})$ is the contribution of $\sigma_1$ toward the energy, and $(\sigma_1 J_{21}+{}_2 J_{22}+ \dots +\sigma_N J_{2N})$ is the contribution of $\sigma_2$, etc. the weights represent the interactions between variables (so $J_{11}$ is the interaction of $\sigma_1$ with itself, $J_{22}$ is the interaction between $\sigma_1$ and $\sigma_2$, etc.). The weights are set depending on the problem being modelled (and for any given problem some weights may be zero). In the system of FIG. 1, the contribution of each variable is modelled by a different respective hardware channel 102, as will be discussed in more detail shortly. In each channel 102, the respective variable $\sigma_i$ is modelled by a respective signal x, e.g. an optical signal, which is generated by a respective signal generator 100. The signals x are shared between channels by splitters 106, and a respective vector multiplier 104 in each channel 100 performs the respective vector-by-vector multiplication (VVM) to determine the respective contribution $(\sigma_1 J_{i1}+\sigma_2 J_{i2}+ \dots +\sigma_N J_{iN})$ of the respective variable being modelled by the respective channel 100.

An example application is the travelling salesperson problem. In a simple example, imagine there are three cites the salesperson needs to visit: London, Edinburgh and Cardiff. These can be modelled with nine variables in a QUBO problem: $v_1$ represents London being visited first, $v_2$ represents London visited second, $v_3$ represents London third, $v_4$ represents Edinburgh first, $v_5$ represents Edinburgh second, $v_6$ represents Edinburgh third, $v_7$ represents Cardiff first, $v_8$ represents Cardiff third, and $v_9$ represents Cardiff third. The elements of the matrix $Q_{ij}$ represent the penalties of travelling between corresponding pairs of cities. So $Q_{15}$ (London first and Edinburgh second) is the distance penalty for London to Edinburgh, etc. Note that some weights, such as $Q_{19}$ (London first then Cardiff third) are set to zero since they are not meaningful in this problem as the total distance is determined by the distances between consecutive cities only. Other weights, such as such as $Q_{12}$ or $Q_{13}$ (London first then London second, or London first then London third) may be set to large penalty values so as to impose the constraint that each city is visited once. The QUBO problem (minimizing $\Sigma_i\Sigma_j Q_{ij}\cdot v_i\cdot v_j$) can then be transformed into an Ising problem (minimize the energy in the Hamiltonian term $-\Sigma_{i,j} J_{ij}\sigma_i\sigma_j$) and solved using the solver system of FIG. 1.

Another example is a molecular similarity problem for estimating the molecular similarity between two molecules. E.g. this could be used to estimate that one molecule is likely to block another for use in a drug. Modelling molecular similarity as a QUBO problem is, in itself, known in the art.

An update rule may be derived for adapting the signals generated by the system in the direction that minimizes the Hamiltonian of the Ising system modelling the problem. A possible update equation for the Ising model may be written as follows:

$$x_i[k+1] = \cos^2\left(a * x_i[k] + \beta * \sum_j J_{ij} * x_j[k] - \frac{\pi}{4} + \zeta_i[k]\right) - \frac{1}{2}, \tag{1}$$

where $x_i$ is the value of the modelling signal generated by the system to model the variable $\sigma_i$ in the Ising model. This update equation is derived from the Hamiltonian of the Ising model. To derive the update equation, the update of each spin may be defined based on the expected effect that changing that spin's value has on the total energy. This can be used to derive an expression for the update of $$x_i \leftarrow x_i + \tanh\left(-\frac{1}{2}\left(H|_{\langle x_i\rangle=1} - H|_{\langle x_i\rangle=-1}\right)\right), \tag{2}$$

where the inside of the brackets above can be evaluated as $2\Sigma_i J_{ij}\langle x_j\rangle$. The terms of the update may be multiplied by constants α and β in order to control the size of the update of each spin at each iteration to ensure the system as a whole is adapted towards a minimum. The δ term in the above equation is Gaussian noise, applied at each iteration to perturb the system to avoid getting 'stuck' at a non-optimal solution. Finally, the $\cos^2(\ )$ term in equation 1 may be derived by observing that the Taylor expansion of $$\cos^2\left(x - \frac{\pi}{4}\right) - \frac{1}{2}$$

is approximately equal to the update equation above for appropriately chosen constants α and β. Cosine squared is a useful approximation for optical spin generation in particular, due to specific hardware that can readily compute this function, described later. However, a different approximation may be made to evaluate other approximations of Equation 2 above. For example, analogue electronic components may be used to evaluate terms of a Taylor expansion of Equation 2 directly and generate an analogue signal for the updated value of $x_i$. For example a cubic or quintic approximation of equation 2 could be used (an expansion only up to the cubic or $5^{th}$-order term, respectively). Indeed the reason for using $\cos^2(x-\pi/4)-½$ in equation (1) is because it approximates to $x-x^3$ for small enough x. In other examples, any other formula that provides similar approximation (i.e. it is linear for x around 0) could also work.

As shown in FIG. 1, to be discussed in more detail shortly, each modelling signal x, modelling a respective variable is generated by a respective signal generator 100 (e.g. optical signal generator) in a respective channel 102. The interactions between variables, corresponding to the matrix J, are modelled by the interaction logic 104.

The above formula will be described in further detail later. Other formulations are possible. Whatever formulations are used, the underlying property of the update equation is that it pushes or adapts the signals $x_1$ such that the physical system being modelled tends towards a minimum energy (i.e. the minimum of the Hamiltonian given above). This is driven by the term $\beta\Sigma_j J_{ij} x_j[k]$, which represents a contribution of the given signal to the energy of the overall system, and whose sign determines the direction of the update. In other words, this term provides feedback to the signal generator 102 to adapt the respective modelling signal x, in the respective channel 102. The sign of this feedback causes an adaptation in the respective modeling signal (x) which drives that signal in a direction which reduces the overall energy in the Hamiltonian of the system. A value of this feedback determines the degree of the adaptation (optionally damped relative to the signal x by the coefficients α and β).

Note that, while the solver determines signals directly representing Ising variables $\sigma_i$, this is equivalent to finding an optimal mapping of the QUBO variables $v_1$, and may be transformed into a different set of variables in the form of the original problem. However, it is important that a mapping exists between a set of Ising variables (spins) which can be determined by the solver and a set of variables optimizing the original problem. Note that in the below description, either of $v_i$ or $\sigma_i$ may be used to denote a binary variable modelled by the solver.

An all-analogue solver can be implemented which models the value of the binary variables $\sigma_i$ as optical or electrical analogue signals, and which performs the above update for each modelled variable using a combination of non-digital hardware components. The solver generates an initial set of signals representing a given assignment of variables and generates new signals in a series of iterative steps based on a feedback signal computed using interaction logic implemented in analogue electronic or optical hardware. An example implementation of a solver architecture for an Ising problem is described in more detail later.

There are many choices of solver configuration which may be arranged according to the present disclosure, each configuration generating a feedback signal which encourages the signals generated over time into a set of signals which minimize the total energy of an 'Ising' system, which can be mapped to an optimal assignment of variables for the given problem definition.

The present disclosure provides a novel architecture for solving combinatorial optimization problems which can be mapped to Ising problems of N variables (sometimes referred to as 'spins'), wherein the variables of the problem are modelled by a set of N distinct hardware channels, and updated iteratively based on feedback provided by signal interaction logic modeling the interaction of the variables according to the given problem definition. The system occurs only in the optical and analogue electronic domains, and the signal interaction logic may be modelled by either optical or analogue electronic hardware. This will now be described in further detail with reference to FIG. 1.

FIG. 1 shows an example schematic block diagram of an analogue solver for combinatorial optimization problems. The architecture comprises N channels 102, each channel i configured to compute a channel feedback signal according to a feedback equation derived for each channel, where the feedback for each channel tends to a set of variables that minimize the 'energy' function defining the problem.

A first channel 102 is configured to compute a modelling signal $x_1$ corresponding to an Ising variable $\sigma_1$ taking either a positive or a negative "spin" value, with the modelling variable $x_1$ updated based on the feedback received at each iteration of the optimization. Note that while the variable σ being modelled may be binary, the modelling signal x may take a soft value that can vary between the two possible binary values of the variable. The process of determining the contribution by each channel will now be described. Note that each channel comprises hardware components which carry out the same steps to compute its respective contribution to the function.

Each channel 102 comprises a signal generator 100, a splitter 106 and signal interaction logic 104, each of which may comprise one or more hardware components. Note that 'logic' as used herein in this context does not refer to digital logic, but rather refers to signal operations carried out using analogue or optical hardware. The signal generator 100 generates a modelling signal for $\sigma_i$, with a measurable property of the signal representing a binary value of the variable $\sigma_i$. The signal may, for example, be an optical signal generated by a light source such as a laser. An optical modulator may be used to modulate a property of the optical signal to model the variable $\sigma_i$. For a binary variable $\sigma_i$ to be encoded in the value of a property such as amplitude, a mapping should be defined between the possible modulated property values (amplitude) and the binary values (e.g. 1 and −1). For example, $x_i$ may lie in the range between [−α, +α], where a is some constant, and where a positive amplitude maps to an Ising variable σ=1, and a negative amplitude maps to an Ising variable $\sigma_i$=−1. Once a modulated signal modelling the variable $\sigma_i$ has been generated (this may be referred to herein as a 'modelling signal' $x_i$), this signal can be copied by applying a splitter 106, to generate multiple instances of that modelling signal $x_i$ encoding the same variable $v_i$, which can be communicated to other channels as shown by the arrows in FIG. 1.

The signal interaction logic 104 receives multiple modelling signals, representing a vector of variables, with each signal received from the splitter 106 of a respective channel j. The interaction logic 104 comprises a vector-by-vector multiplier that combines the modelling signals $x_i$ into a signal representing a weighted sum of the modelled variables, with the weights corresponding to the relevant elements of the matrix J defining the spin interaction for the Ising problem. There are various possible hardware configurations that may be used to perform vector-by-vector multiplication. One example disclosed herein is a wavelength selective switch (WSS). This is described in further detail later. Optical vector-by-vector multiplication may alternatively be carried out by other, known optical technology including spatial light modulators (SLM), ring resonators or Mach-Zehnder interferometers (MZIs), or some combination of such technologies or other suitable optical components. As another alternative, the vector-by-vector multiplication operation may also be implemented in the analogue electronic domain (i.e. using electrical signals), for example by using memristors.

Note that, while FIG. 1 shows a separate interaction logic 104 for each channel, this interaction logic does not necessarily comprise a separate hardware component for computing signal interactions for each channel. In some embodiments, the interaction logic of the whole system comprises a global vector-by-matrix multiplier. In this case, the part of the vector-by-matrix multiplier carrying out the vector-by-vector multiplication for the given channel corresponds with the interaction logic for that channel shown in FIG. 1. E.g. each interaction logic may correspond to a different row of a 2D spatial light modulator, as will be discussed in more detail later with reference to the example of FIG. 9. Note also that more generally, the physical parts of the global vector-by-matrix multiplier implementing the different individual interaction logic blocks 104 may or may not overlap with one another. In other embodiments on the other hand, a distinct hardware component is configured to perform vector-by-vector multiplication for each channel. The effect of both architectures is the same. Both of these alternative architectures are discussed in more detail below, in the context of a wavelength selective switch implementation of a vector-by-vector (or vector-by-matrix) multiplier, shown in FIGS. 8 and 9.

The feedback signal is passed back along a feedback path 108 to the signal generator 104, which determines a new signal according to the hardware of the system. The updated signal may be generated, for example, by passing the feedback signal to a modulator to modulate the input signal from a light source, and detecting the resulting optical signal with a photodiode. Alternatively, in some embodiments, an analogue electronic signal encoding the feedback signal may be generated directly using analogue electronic components, for example, by using memristors. Either way, the system is designed such that over time it tends to a stable state which maps to an optimal assignment of the variables which minimize the energy function for the given problem formula.

Each channel updates its signals according to the same scheme described above, until a stable state is reached for all signals, corresponding to a particular assignment of variables to values. The pairwise interactions of an arbitrary number of variables $\sigma_1, \ldots, \sigma_N$ may be modelled in this way, by setting up N channels and splitting each signal to N identical copies of the signal, one to be sent to each channel.

Figure 2:
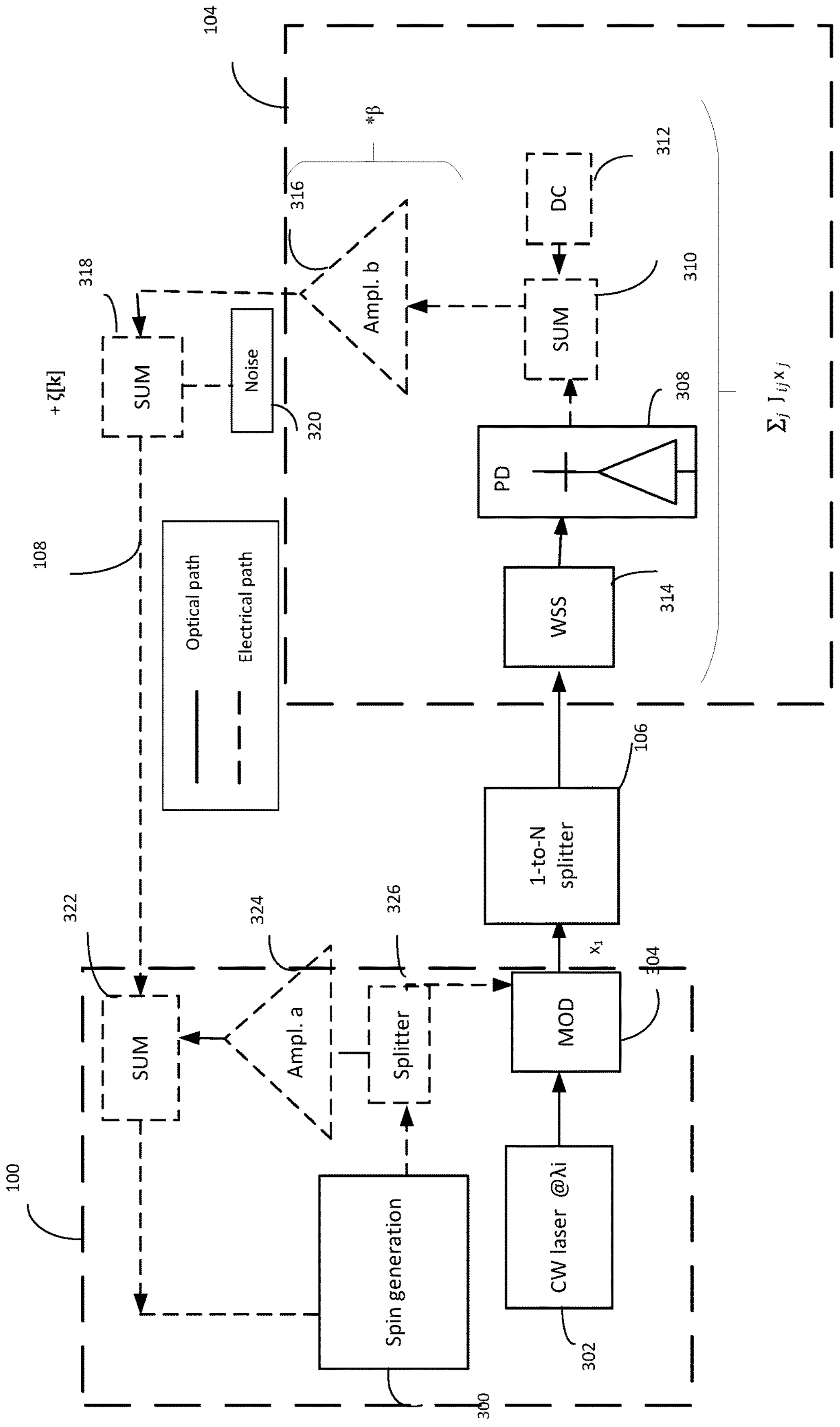
FIG. 2 shows a schematic block diagram of the hardware implementation of one channel of an optical solver architecture.

FIG. 2 shows an example optical solver for Ising problems of N variables implemented in optical hardware. The solver comprises N channels 102, each channel i comprising hardware implementing a signal generator 100, splitter 106 and interaction logic 104 to generate a signal which is representative of a binary value assigned to variable i. For clarity, FIG. 2 shows a schematic diagram of only a single channel 102, but this may be duplicated in each of the channels 102. Note that modelling signals are output by the splitter 106 of FIG. 2 to all other channels, and received interaction logic 104 from each of the other channels.

Each channel 102 iteratively generates an updated modelling signal $x_1$ according to a feedback signal until the system settles into a stable set of states, representing an optimal assignment of variables according to the optimization problem to be solved. As described above, an update of the signal is given by the update equation, for example:

$$x_i[k+1] = \cos^2\left(a * x_i[k] + \beta * \sum_j J_{ij} * x_j[k] - \frac{\pi}{4} + \zeta_i[k]\right) - \frac{1}{2}$$

where $x_i[k]$ is the modelling signal at the $k^{th}$ iteration, $J_{ij}$ is the coefficient defining the interaction between the $i^{th}$ and $j^{th}$ variables according to the given problem as mapped to an Ising system, α and β are multiplicative constants, and $\delta_i[k]$ is a Gaussian noise term. The factors α and β are chosen so as to control the size of the update of each variable, where a large α relative to β causes the signal to move slowly in the direction given by the β term, i.e. $\beta*\Sigma J_{ij}x_{ij}[k]$. This is important in a system of many variables, as large updates at each step can prevent convergence of the full system to a suitable local optimum. Similarly the noise term provides a perturbation to the signal at each step to ensure that the system does not become 'stuck' in a local minimum that is a poor approximation of an optimal set of variables. The above equation may be derived mathematically by applying known principles based on the Hamiltonian of the Ising model and using sensible approximations. In particular, the $\cos^2(\ )$ term approximates the optimal update, which is easily applied using particular optical hardware, described later. The operation of a single channel 102 will now be described with reference to FIG. 2.

An initial signal is generated by the spin generation hardware 300 representing an initial binary value of the variable $\sigma_i$ modelled by the given channel. Note that 'spin' is used herein to refer to a signal representing a binary variable of an Ising system, and should not be confused with the quantum mechanical definition of spin. An example implementation of the hardware components of the spin generation hardware 300 are described in more detail below, with reference to FIG. 3. The signal output by the spin generator is sent as an electrical signal, as shown by the dashed arrow from the spin generation hardware 300, to a splitter 326, which sends the signal over two different paths.

Note that in this embodiment, the spin generator 300 comprises only part of the signal generator 100 of FIG. 1. In the example architecture of FIG. 2, the signal generator 100 comprises a spin generator 300, optical source 302, modulator 304, splitter 326, amplifier 324 and analogue hardware 322 to sum electrical signals. As described above, the output of the signal generation 100 is a modelling signal $x_1$.

Along the first path, the signal is combined with the output of a light source 302, which is a laser at a specific wavelength, in a modulator 304 to modulate the laser beam, thereby generating a modelling signal $x_1$, as described above with reference to FIG. 1. The modulator 304 modulates the optical signal to encode the electrical signal modelling the variable, and may use, for example, the amplitude of the optical signal, its phase or a combination of them. As mentioned above, a mapping should exist between a measurable property of the optical signal and a binary variable, such that the detected optical signal can encode both positive and negative values. This may be done using a coherent detection scheme, which measures the phase and frequency information of the received signal, as well as its intensity. If only the amplitude of the signal and its sign is of interest for detection, a form of direct detection may be used, which may be referred to herein as 'differential detection'. This is described in more detail below.

The modulator 304 sends the modelling signal to a 1-to-N splitter 306, which communicates an identical optical signal to a vector-by-vector multiplier 314 (VVM) in each of the N channels of the system. In the example of FIG. 2, the vector-by-vector multiplier 313 is implemented as a wavelength-selective switch. However, in other embodiments, this may be implemented by a ring resonator, spatial light modulator or Mach-Zehnder interferometer (MZI), or analogue electronic components. Note that in embodiments, such as those that employ a WSS, the signal generated at each channel may be generated at a different wavelength (i.e. color) to enable the interaction of the different signals in a vector by vector multiplication without causing interference between the N signals. The VVM 314 is configured to multiply the input set of signals $\{x_1, \ldots, x_N\}$ representing a vector of variables $\{\sigma_1, \ldots, \sigma_N\}$ by a corresponding subset of elements of a matrix J. For a given channel i, the wavelength selective switch calculates a signal representing the vector-by-vector term of Eq. 1 for each iteration k, i.e. $\sigma_j J_{ij} x_j[k]$, where $x_j[k]$ is the signal generated at signal generation hardware for channel j. The operation of a wavelength selective switch to compute a vector multiplication is described in further detail later.

In embodiments, the signal output by the VVM 314 remains in the optical domain, as shown by the unbroken lines in FIG. 2, and this signal is converted to an electrical signal by detecting it at a photodetector. In the illustrated embodiment, a direct detection scheme is used and an adaptive direct current (DC) term 312 is added to achieve a differential detection using analogue hardware 310 configured to perform a sum. The amplifier 316 multiplies the adapted sum by a constant β, outputting a feedback path 108. The $$-\frac{\pi}{4}$$

term of Equation 1 is implemented in hardware by setting the modulator at a specific operation point. A Gaussian noise term 320 (corresponding with δ[k] in Eq. 1) is added to the feedback signal by analogue hardware 318 configured to perform addition of electrical signals, such as an electronic mixer. A Gaussian distribution may be defined, from which the Gaussian noise term δ[k] may be sampled at each iteration. Hardware for adding electrical signals is well known in the art and will not be described further herein. δ[k] is assumed to be small random (gaussian) noise. In each iteration, δ[k] takes takes a new value (from the same distribution).

Along the second path, the signal i is output to an amplifier which amplifies the electrical signal, representing the multiplication of the variable $\sigma_i$ by a constant α, shown in Eq. 1. This is added to the sum $$\beta * \sum_j J_{ij} x_j[k] - \frac{\pi}{4} + \zeta[k]$$

which is communicated along a feedback path from the analogue addition hardware 318, to obtain a signal $$a * x_i[k] + \beta * \sum_j J_{ij} x_j[k] - \frac{\pi}{4} + \zeta[k].$$

Finally, the updated signal is determined in the spin generation hardware 300, which modulates an optical signal based on the feedback signal 108 to compute a cosine of the feedback signal, detecting this signal at a photodetector and adding a second adaptive term, in order to evaluate the full expression of Eq. 1 and output an analogue electronic signal. Note that direct detection by the photodetector generates the square of the cosine in Eq. 1, as the photodetector measures intensity of the optical signal which is proportional to the square of the signal itself. For this reason, direct detection cannot be used for phase-modulated signals, as all phase information is lost in the detection of light intensity.

An example of the evaluation of the update equation by the spin generator 300 is described below with reference to FIG. 3. This process is repeated at each iteration, generating an updated signal for each channel, determining the interaction of the N signals, computing a new feedback signal and repeating until the system stabilizes.

Note that multiple components operating together in FIG. 2 correspond to the general signal generator 100 described above with reference to FIG. 1. The signal generator 100 in this implementation comprises all of the spin generation hardware 300, laser 302, analogue addition hardware 322, splitter 326 and modulator 304. Similarly, the interaction logic 104 described above with reference to FIG. 1 comprises both a vector-by-vector multiplier implemented in a wavelength selective switch as well as analogue hardware components to perform addition and amplification of the feedback signal. Other embodiments may include further hardware to carry out operations on optical or analogue signals, including photodetectors and modulators, for example.

Each channel i is implemented in hardware which computes updates to that channel's signal in parallel. Updates continue until the system is stopped, for example after a predetermined stopping point of M iterations. Alternatively, the signals may be measured periodically, and the system stopped if there are no changes observed between subsequent measurements. An approximate solution is found when the system stabilizes, i.e. the set of variables modeled by the generated signals stays constant from one iteration to the next. This stable set of signals may then be mapped directly to an assignment of N variables which approximate the solution for the given Ising problem.

The example embodiment shown in FIG. 2 uses a space division multiplexing architecture (i.e. where each variable is generated in separate hardware), with binary variables encoded in the signal amplitude, and a VVM implemented by a wavelength selective switch in each of a plurality of parallel hardware channels. However, alternative embodiments may model variables using a different measurable property of the signal such as phase or frequency and may also use other types of VVMs such as ring resonators, Mach Zehnder interferometers, or electronic VVMs implemented using memristors. It is also possible to use time division instead of spatial division, using delay lines to combine the time-division multiplexed signals.

Figure 3:
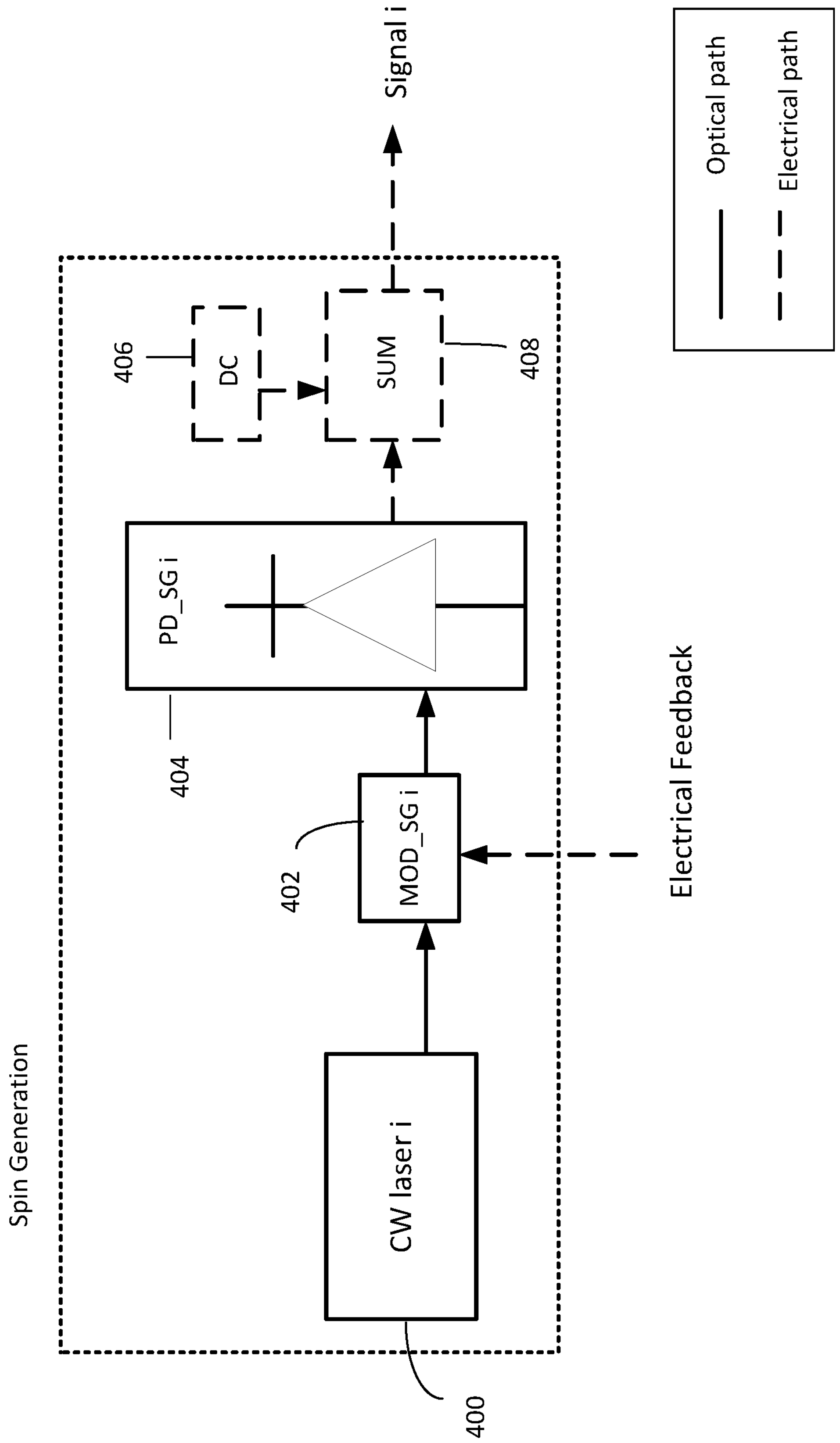
FIG. 3 shows a schematic block diagram of the spin generation hardware.

FIG. 3 shows a schematic block diagram of an example spin generation hardware component 300. A light source 400, such as a continuous wave laser at a specified wavelength, is used to generate an optical signal which is passed to a spin generation modulator 402 to generate a spin. An electrical feedback signal based on the signals generated at the previous iteration is also received from the VVM 315 of the interaction logic 104 to the modulator 402. The modulator 402 modulates the optical signal from the light source 400 according to the electrical feedback signal. The modulator 402 may be a Mach-Zehnder modulator, which split the input signal to be interfered with itself. A value corresponding to the feedback signal is set within one of the arms by a modulator and the output of the modulator 402 is the in-phase component of the interfering electrical fields—in other words, the cos(function of Eq. 1 applied to the feedback signal, which becomes $\cos^2(\ )$ when detected as the light intensity at the photodetector 404. Detection at the signal generation photodetector 404 converts the resulting signal back to the analogue domain. For direct detection of the light intensity using a photodetector 404, the signal is always positive and within the range of [0,1] given by the $\cos^2(\ )$ function. An adaptive DC term 406 representing an additive term of the equation, i.e. the −½ term in Equation 1, may be added to the positive signal to convert the range of the signal to [−½, 1/2] to appropriately model Ising variables. The output signal is then passed to the splitter 306 to generate the modelling signal $x_i$ to be input to VVMs of other channels, as described above with reference to FIG. 2.

During each iteration of the example solver shown in FIG. 3, the signal is converted from the optical domain to the analogue domain and vice versa twice. As shown in FIG. 3, while the feedback signal is initially converted by the signal generator 300 to an optical signal, it is then detected at a photodetector converting this back into an analogue signal. Modulators are used with light sources to convert the signal from the analogue domain to the optical domain to be processed by optical signal interaction logic, while photodetectors are used to convert the output signals of the interaction logic from the optical domain back to the analogue domain.

Figure 4:
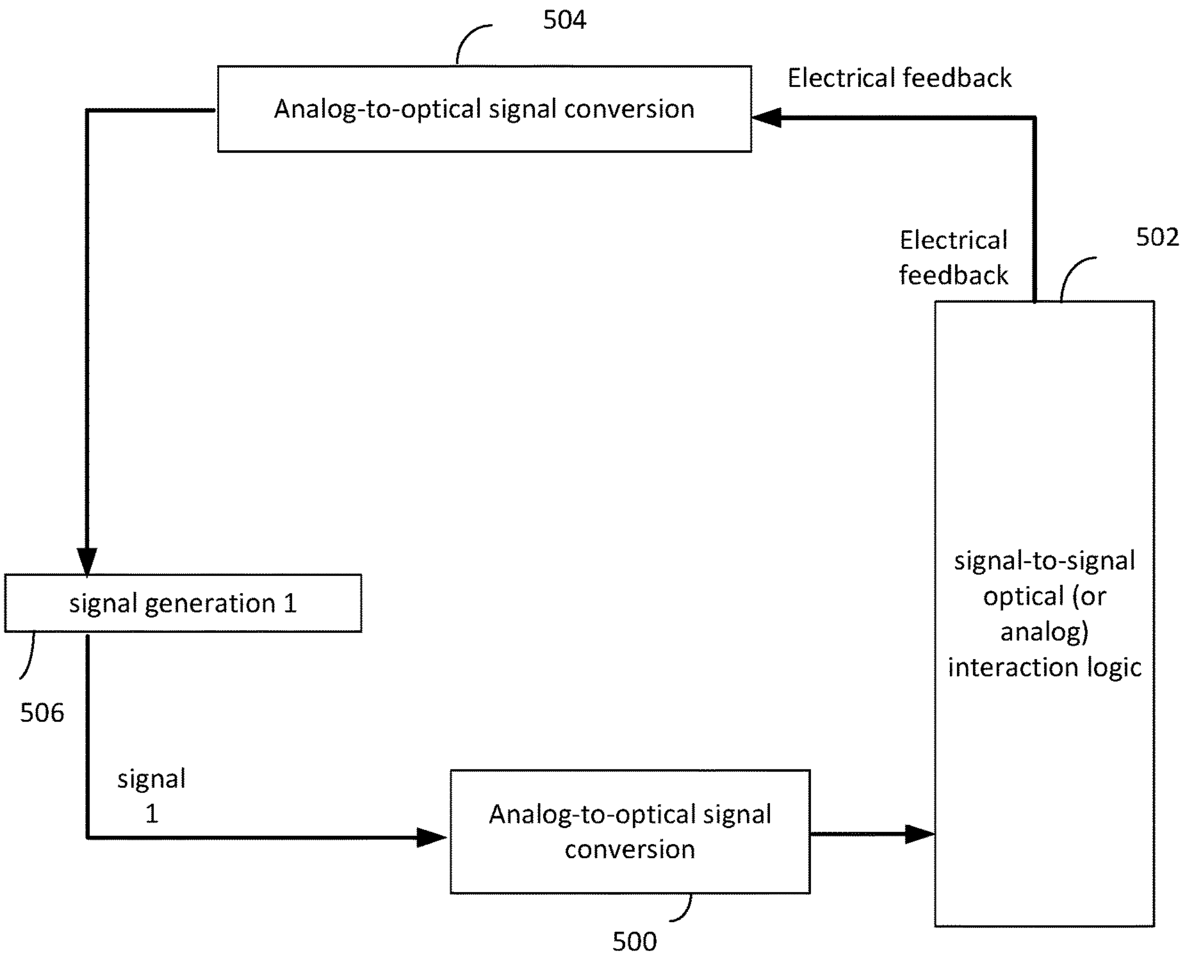
FIG. 4 shows a schematic block diagram of signal conversions between the analogue and optical domains during operation of the solver.

FIG. 4 shows a schematic block diagram of the conversion of a signal between optical and analogue domains for one channel in the example solver described above and shown in FIG. 2, comprising N hardware channels. The spin generation component 300, described above with reference to FIG. 3, outputs an electrical signal, denoted 'signal 1' in FIG. 4. In the present example solver, the signal interaction logic comprises an optical vector-by-vector multiplier 314, e.g. in the form of a wavelength selective switch, which acts on optical signals. However, as noted above, the interaction logic of any given channel may comprise a part of an overall signal interaction hardware implementing vector-by-matrix multiplication to produce a vector of feedback signals for multiple channels. An example of this architecture is described in more detail below, with reference to FIG. 9. A first analog-to-optical signal conversion 500 occurs after the signal is generated to pass an optical signal to the signal-to-signal interaction logic 502. The vector-by-vector multiplication result is evaluated by detection at a photodetector 308, converting the signal to the optical domain and further arithmetic operations are carried out in the analogue domain, as shown in FIG. 2.

The signal-to-signal interaction logic 502 of FIG. 4 comprises both the optical VVM operation and the conversion to an electrical feedback signal. The output electrical feedback signal is then passed through a second analog-to-optical signal conversion 504, where the electrical feedback signal is converted back to an optical signal by a modulator. In FIGS. 3 and 4, this occurs within the spin generation hardware 300, where the spin generation light source 400 and modulator 402 convert the electrical feedback signal into an optical signal. The signal generation 506 of FIG. 4 corresponds only to the detection of the signal generated by the signal generation hardware 300, which converts the signal from the optical to the analogue domain, rather than the full signal generation process described in FIG. 3.

Note that in the example embodiment described above, the vector-by-vector multiplication operation of the signal interaction logic 504 is implemented in the optical domain, e.g. by a wavelength selective switch, described later. However, in other embodiments, the signal interaction may be implemented in the analogue electronic domain. Similarly, in some embodiments, other arithmetic operations such as addition of signals, may be carried out in the optical domain rather than the analogue electronic domains. The process shown in FIG. 4 is thus specific to the particular hardware configuration used to implement the solver shown in FIG. 2.

As described above, an advantage of an architecture described herein is that it uses a 'space-division' multiplexing architecture, meaning that a system of N variables is modelled using separate hardware for each variable. Some state-of-the-art solvers, by contrast, use a time-division multiplexing architecture. FIG. 5A shows an example architecture which uses time-division multiplexing. Time-division multiplexing architecture uses a single set of signal generation hardware 510*a* for generation of signals representing all variables of the system, and a single piece of hardware implementing signal interaction logic. The signal generation hardware 512*a* generates signals at time intervals, with the interaction logic enabling interaction of time-divided signals by applying a delay to signals received at different times at the interaction hardware. The time complexity of the solver increases linearly with the number of variables being modelled, and so this architecture is slower for larger systems.

Figure 5B:
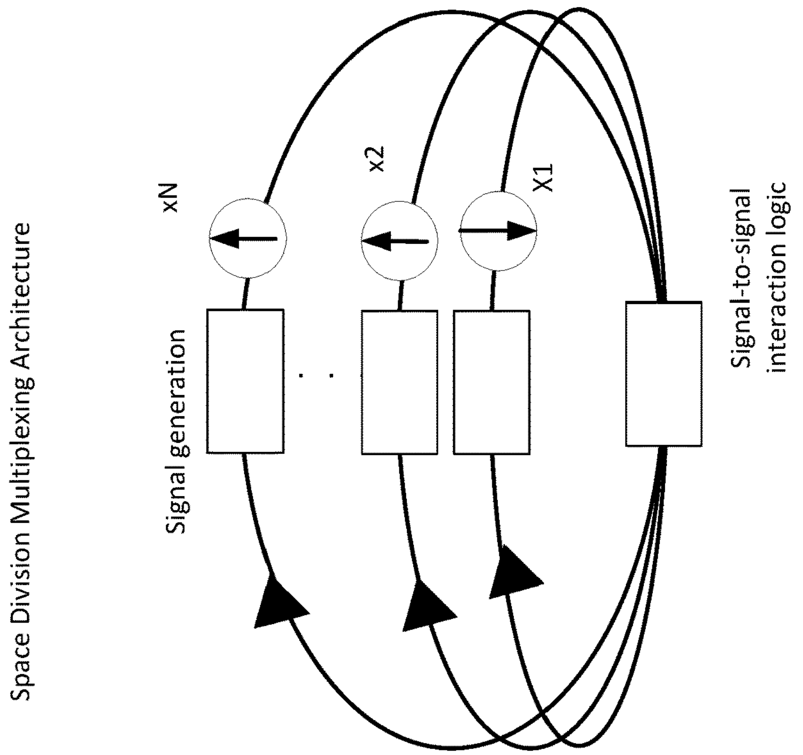
FIGS. 5A and 5B respectively show examples of time division and space division multiplexing architectures.
Figure 5A:
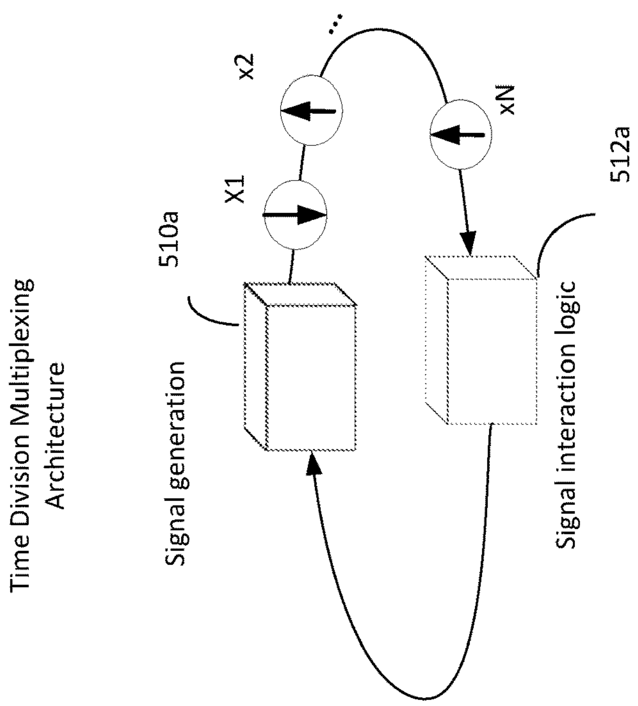

By contrast, the space-division multiplexing architecture shown in FIG. 5B comprises a separate signal generator 510*b* for each variable, with all signals interacting in signal interaction hardware 512*b*. The separate physical generation allows all signals to be generated simultaneously, such that the system can be scaled up to a large number of variables by simply adding more hardware, maintaining a quasi-constant time per iteration. While the signal interaction logic hardware 512*b* in FIG. 5B for the full solver system is shown as a single block for simplicity, the interaction logic may alternatively be implemented to include a separate hardware VVM for each channel, as described above and shown in FIG. 2.

Direct Detection

As described with reference to FIG. 4, in embodiments the signal is converted between optical and analogue domains during operation of the solver. For example, the electric feedback signal representing Equation 1 may be converted to the optical domain using a Mach-Zehnder modulator, which applies the cos( ) function, before evaluating the full equation by detecting it at a photodetector. Direct detection of light intensity measures the square of the signal, which is positive only. However when dealing with signals that take positive or negative values, such as the signals modelling Ising variables herein, conversion between the analogue electronic and optical domain should preserve the sign information in the signal, or any conversion that causes the signal to be limited, for example, to positive values should be corrected by a subsequent operation in the relevant domain. 'Real-valued' may be used herein to refer to optical signals which have values along the real axis of the complex plane, i.e. signals which can take positive or negative real values.

One possible detection scheme that allows detection of positive and negative values is coherent detection, which measures the amplitude and phase information of the received optical signal, which can be either positive or negative. However, a disadvantage of coherent detection is that it is more complex to implement than direct detection of light intensity. Coherent detection schemes often require digital signal processing. Some of the advantages of processing signals in the optical and analogue electronic domains, such as the speed of transmission of the signal are lost or diminished if converting back to the digital domain to carry out coherent detection.

An alternative detection method uses direct detection, i.e. detection of light intensity, which does not require the system complexity of coherent detection. Direct detection measures a positive-only signal in the analogue electronic domain, which may then be offset in the analogue electronic domain by adding or subtracting adaptive terms to correct the range of the signal to allow positive or negative values. This may be referred to as 'differential detection'. Similar detection schemes are used in telecommunications to detect binary phase shift keying signals, which are real-valued.

Figure 6:
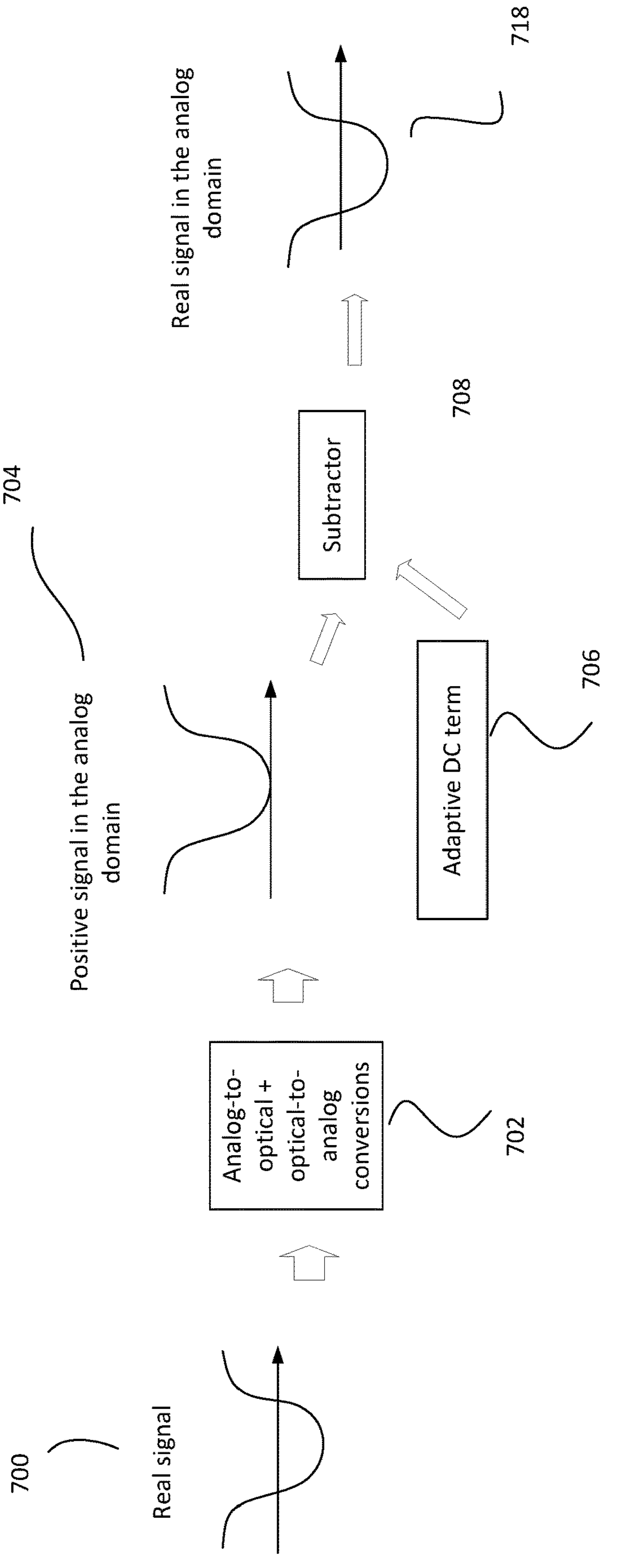
FIG. 6 shows the use of a direct detection scheme with adaptive DC term.

A schematic illustration of this direct detection scheme is shown in FIG. 6 for the detection of real-valued optical signals, such as outputs of optical vector multipliers. This is now described for the example application of the solver of FIG. 2, described above. A real signal 700, which can take positive or negative values, for example the modelling signal $x_i$ generated at channel i by the spin generator 300 to represent Equation 1 (which can take values in the range [−½,+½]), is converted to the optical domain first by at least one analog-to-optical conversion, for example by a modulator 304. An optical vector-by-vector multiplication is carried out for the modelling signal of the channel and the modelling signals received from the other channels, multiplying the input vector by the relevant weights corresponding to the interactions for channel i, outputting an optical signal for the channel representing a weighted sum of input signals.

This signal is converted into an analogue signal by detecting it at photodetector 308. However, the detected signal is restricted to be positive only, as the photodetector 404 measures light intensity, which cannot have negative values. To correct this, the output signals of the VVM operation are corrected to allow positive or negative values by adding a DC offset term, shown in FIG. 2 as 312. This DC offset term is specific to each spin and evaluated and set at the initialization of the system.

This enables measurement of positive and negative signals required by the solver by adjusting the signal in the analogue domain. This differential detection scheme is simpler than a coherent one and can be implemented easily to convert the signal directly from the optical to the analogue electronic domain. However, for the VVM output, if the given input signals have different wavelengths, attention should be paid that the path lengths of all signals are matched. Incoherent addition of signals will be described in more detail below in the context of the operation of a wavelength selective switch.

While this differential detection scheme is described above in relation to the present solver architecture, direct detection with adaptive offset terms can be used for any application in which optical vector-by-vector multiplication operations taking real positive and negative values can be implemented. For example, this may be used in machine learning applications, such as deep neural networks, in which input vectors may be multiplied by network weights. This differential detection scheme may be applied to applications using various types of optical VVMs such as spatial light modulators (SLM), ring resonators, or wavelength selective switches, described in more detail below. This differential detection method has the advantage of allowing operations to be carried out in the optical domain, providing a significant speed improvement over digital operations, while enabling the desired range of real valued signals to be modelled, without requiring the difficult implementation of coherent detection schemes. Such a differential detection scheme may be implemented without requiring phase sensitivity of the system if different wavelengths are used for the input signals of the OVM, such as in a wavelength-selective switch or ring resonator VVM.

Figure 6A:
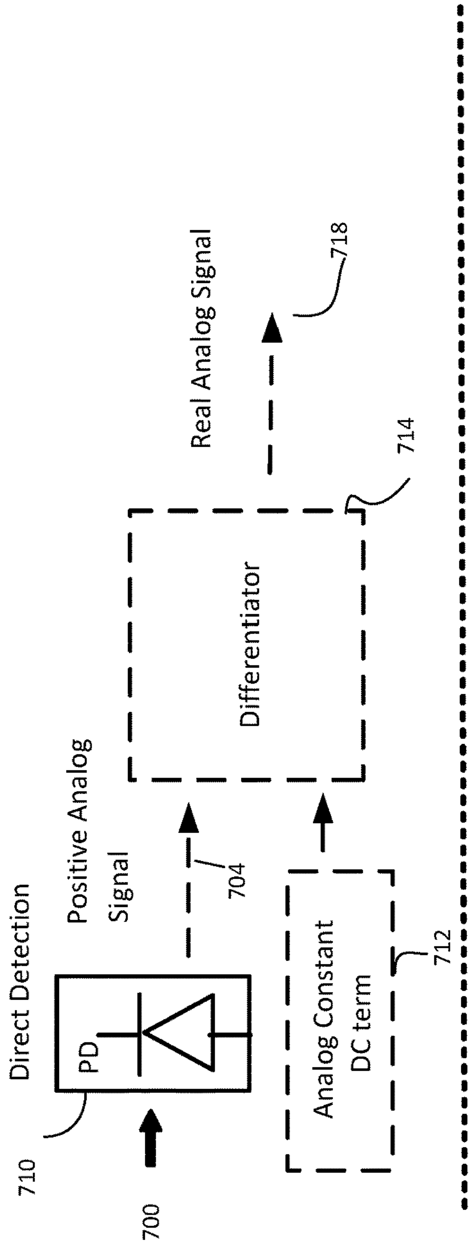
FIGS. 6A and 6B show schematic block diagrams of direct detection with an offset term and differential detection, respectively.

FIG. 6A is a schematic block diagram of a differential detection scheme, where a constant analogue electronic DC term 712 is added to the signal detected by a photodetector. An optical signal is received at a photodetector 710, which, as described above, converts the real optical signal 700 into an analogue signal 704 that can take positive values only. A separate analogue constant DC term 712 is subtracted from the positive analogue signal in a differentiator 714, which is a possible implementation of the subtractor 708 shown in FIG. 6. The analogue DC term 712 may be generated using one or more analogue electronic components, or by using an optical signal, as described below with reference to FIG. 6B. Analogue differentiators are well-known in the art of electronic engineering and will not be described further herein. The output of the differentiator is a real analogue signal 718 obtained by subtracting the constant DC term from the positive-only signal 704, which brings the analogue signal into the desired range, where it may take positive or negative values. As previously mentioned, each DC term is specific to a photodetector and it may be evaluated and set when the system is initialized. Note that the DC term may be viewed equivalently as a negatively valued analogue signal which is added to the positive analog signal 704, or as a positive signal subtracted from the positive analog signal 704.

Figure 6B:
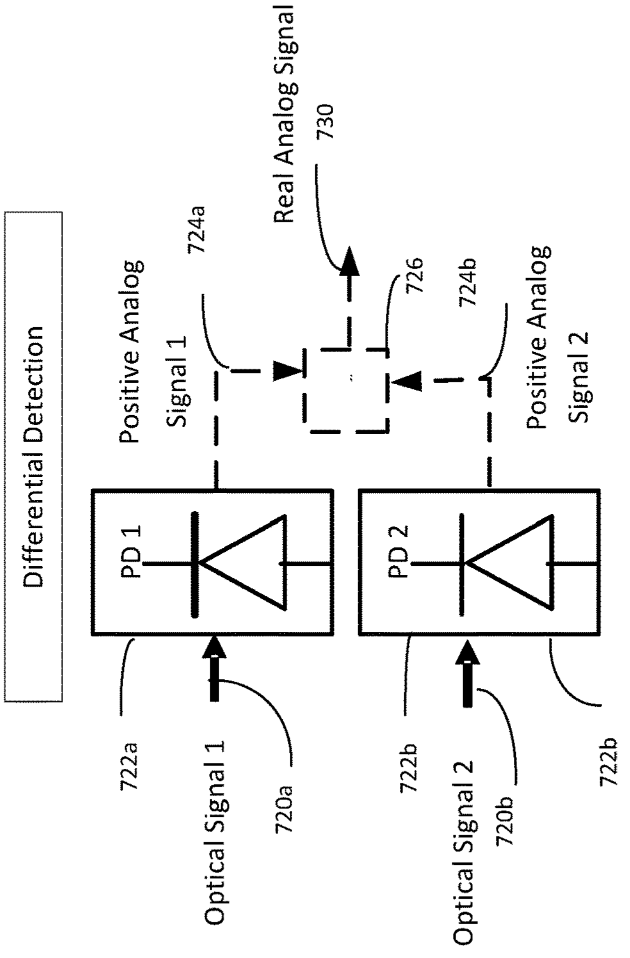

FIG. 6B is a schematic block diagram of an optical-offset differential detection scheme, in which any two optical signals 720*a*, 720*b* may be detected at a pair of photodetectors 722*a*, 722*b*, and a difference may be taken between the electrical signals 724*a*, 724*b* generated at the respective detectors 722*a*, 722*b* using an analogue differentiator 726. This is a known detection configuration, which may be used to implement the above-described method of differential detection, where a real-valued signal, for example the output of an optical VVM, is encoded in the first optical signal 720*a*, and a constant value is encoded in a second, offset optical signal 720*b*, which may be provided by a separate light source modulated by a constant value. Each of the signals may be converted to analogue electronic signals 724*a*, 724*b*, which take only positive values. These are combined in a differentiator 726 which subtracts the constant offset analogue signal 2 from the analogue signal 1 obtained by detecting the real-valued signal to be evaluated. The effect of this differential detection scheme is the same as the differential detection of FIG. 6A, where in this case the DC offset term is obtained by the detection of the constant optical signal 720*b*. However, for this implementation of differential detection, a second optical offset signal needs to be generated, instead of generating an analogue DC offset signal directly using analogue electronic components.

Note that in the described embodiments, the solver models x and the corresponding feedback signal in the form of positive and negative "spin" signals representing Ising variables, e.g. −1/1, as a method to solve QUBO problems which are easily mapped to Ising problems. The sign of the feedback signal represents the direction in which to drive the modelling signal x to reduce the energy of the Hamiltonian. However, in other embodiments, it is not excluded that purely positive signals could be used. Instead the matrix J may include positive and negative weights. In such embodiments the DC offset 310, 320 is not necessarily required. For example, QUBO variables 1/0 may be modelled directly. In this case, the positive signals generated by direct detection may not need to be corrected.

Wavelength Selective Switch for Optical VVM

As described above, each channel may implement a respective vector-by-vector multiplier as part of the interaction logic 104. Various possible vector-by-vector multiplier configurations may be used with the solver architecture disclosed herein. Some VVMs may be implemented entirely in the optical domain, such as spatial light modulators, ring resonators, and Mach-Zehnder Interferometers. Other VVMs may be implemented in the analogue electronic domain, for example using memristors to compute the weighted sum of electrical signals.

One example of an optical VVM (OVVM) which is disclosed herein for use in some embodiments of the solver architecture disclosed herein is a wavelength selective switch. (WSS). WSSs are used in telecommunication applications and they allow signals at different wavelengths to be independently optimized to guarantee that all the signals are transmitted at the same power, as well as allowing signals of different wavelengths to be combined together in a single optical fiber or vice versa for add or drop functions at transmission nodes.

The implementation of WSS for optical vector multiplication is based on the fact that WSSs have the capability of emulating the product function as they attenuate (weigh) each individual wavelength and the addition function, achieved by its capability of combining different wavelength into a single fiber, subsequently detected by at least one photodetector.

Figure 7:
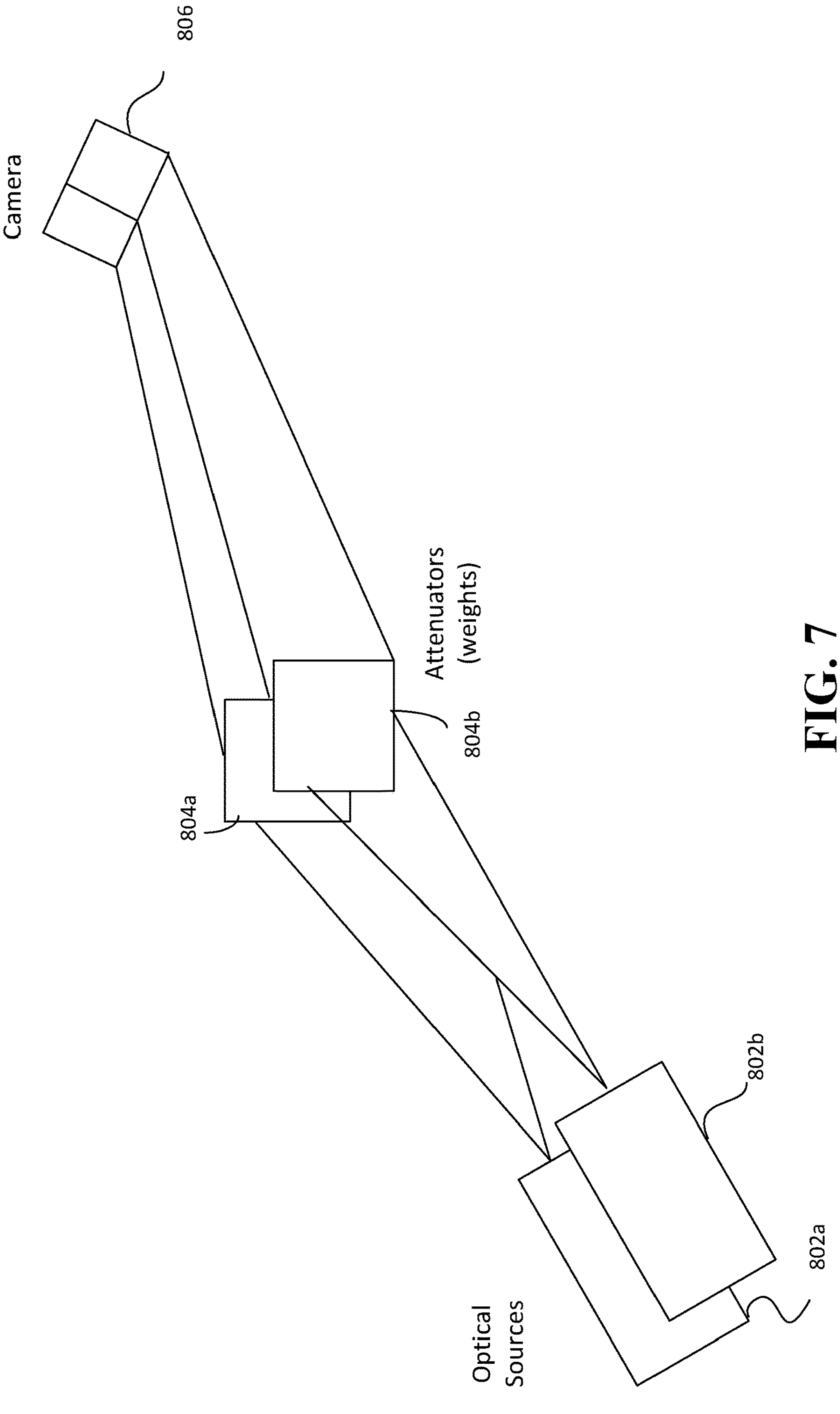
FIG. 7 shows a schematic diagram illustrating the concept of optical vector multiplication.

FIG. 7 is a schematic block diagram showing the principle of multiplying optical signals by constant factors (weights). In the example of FIG. 7, two separate optical signals are provided from optical sources 802*a*, 802*b*. The power or intensity of these signals may be measured at a photodetector 806, which generates an electrical signal which depends on the intensity of the incident light. A multiplication of the values encoded by an optical signal can therefore be implemented by applying attenuators, or loss inducing components, 804*a*, 804*b* each of which reduce the intensity of the respective optical signals by a configurable constant factor, meaning the resulting analogue signal when detected at the photodetector or camera 806 is scaled by a loss factor of the attenuator applied, which may be interpreted as a 'weight' applied to the input signal. If the two separate optical signals share the same wavelength, their addition at the photodetector will be coherent (i. e. the two optical signals will be added in electric field), while if the two separate optical signals have different wavelengths and their difference is much bigger that the photodetector bandwidth their addition at the photodetector will be incoherent (i. e. the two optical signals will add in power.

A vector-by-matrix multiplication can be broken down into a series of vector-by-vector products of the following form:

$$o_i = \sum_j W_{ij} y_j$$

Each element of the output vector o is a sum of elements of the $i^{th}$ row of the weight matrix W applied to the input vector y.

The configuration of FIG. 7 can be used to implement the weighted sum of the optical vector-by-vector multiplication, by applying attenuators 804*a*, 804*b* to a set of input signals representing an input vector, where the attenuators are set so as to correspond to the appropriate elements of a weight matrix. The sum of the weighted inputs is performed by combining the signals in a camera or other detection system 806 which can perform coherent or incoherent addition of optical signals. Coherent addition, which is required if the optical signals share the same wavelength, requires all signals to be phase-matched exactly in order to compute the correct output signal. This is difficult at optical wavelengths. For incoherent addition, the photodetector requires the input signals to have the same path length, within a tolerance given by the bandwidth of the given detector. Incoherent addition with direct detection at a photodetector computes a total power or intensity of the input light signals. This is described later for incoherent detection in a wavelength selective switch, wherein the respective signals being added are of different wavelengths.

The operation of a wavelength selective switch to perform vector-by-vector or vector-by-matrix multiplication based on the above principle will now be described with reference to FIG. 8.

The input vector v is represented by a set of optical signals 800 of different wavelengths, which may be, for example, a set of modelling signals $\{x_1, \ldots, x_N\}$ received from the N channels of a solver such as the one shown in FIG. 2 and described above. The input fibers 808 carrying the separate optical signals 800 for the input vector are shown at the bottom right of FIG. 8.

Figure 8:
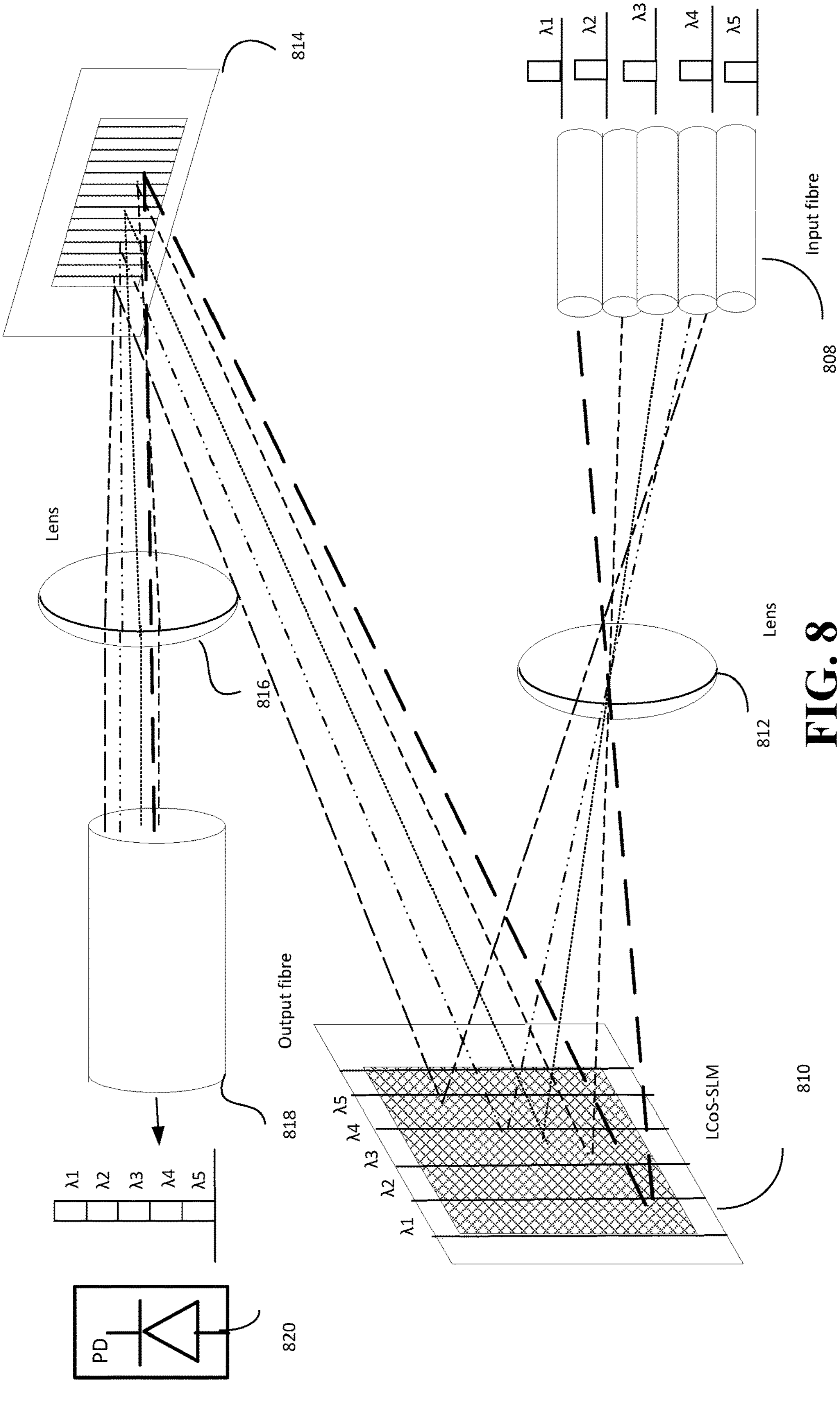
FIG. 8 shows the operation of a wavelength selective switch to carry out optical vector-by-vector multiplications.

Note: for simplicity of illustration the fibers 808, 818 for only one channel 102 of the solver are shown in FIG. 8. However, in embodiments where a WSS is applied in such a solver, then there may be a separate set of fibers 808, 818 for each channel 102. Each set of input fibers corresponds to the inputs from the splitters 106 in a given channel 100. The output fiber 818 provides the output of the respective vector-by-vector multiplier (thus overall performing a vector-by-matrix multiplication). In this case, different corresponding subsets of the elements of the SLM 810 implement the interaction logic 104 of the different channels. In embodiments, these elements may be implemented as different pixels at different positions on the same physical plate of the SLM 810 (e.g. same piece of glass or plastic).

The corresponding elements of the weight matrix Q are implemented in a spatial light modulator (SLM) 810, one example of which is a liquid crystal on silicon spatial light modulator (LCoS-SLM), which modulates each input optical signal 800 by a specific factor as described above. In this case, the signals are modulated by a factor dependent on the wavelength of the input, where each column of the SLM 810 corresponds to a different incident wavelength. The input signals 808 are passed through a lens to ensure that each of the signals reach the SLM in the correct horizontal position for its respective wavelength.

The output signal for a given channel is obtained by detecting at a photodetector 820 the modulated optical signals, combined into a single beam 818, which is then detected at a photodetector 820. The combination of the various optical signals, each having a different wavelength, into a single beam at the photodetector 820 may be referred to as wavelength-division multiplexing (WDM). This is facilitated by an arrangement of one or more lenses 816 and/or dispersive element(s) 814 (e.g. diffraction elements such as prisms or diffraction gratings); while the SLM guarantees independent weights to each individual wavelength.

The photodetector 820 performs incoherent addition of the various constituent light signals of different wavelengths. In order for the incoherent detection to compute the sum of the intensities of the constituent signals, it should be ensured that the difference in frequency of the respective signals being combined is much larger than the frequency bandwidth of the photodetector, meaning that the photodetector does not detect cross-terms from the interaction of the signals with each other. Incoherent detection of signals of different wavelengths does not require the signals to be phase matched. By contrast, if using a VVM architecture that takes as input light sources of the same wavelength, coherent addition must be performed at the detector, which has the difficult requirement of requiring all signals to be phase matched.

An architecture similar to that shown in FIG. 8 is known for building wavelength selective switch devices for telecommunication applications, where it is typically run in the opposite direction, with the input being a single optical fiber, and the output being a set of optical signals of different wavelengths in different optical fibers. In that scenario, wavelength selective switches are used to add or drop specific wavelengths at specific transmission nodes as well as guarantee that the signals are flat across the transmitted spectrum.

Extended WSS Architecture for Optical Vector-by-Matrix Multiplication

As described above, the solver described herein for Ising problems may be implemented in one of two architectures. In the first, as shown in FIG. 2, the signal interaction logic 104 is implemented as a separate vector-by-matrix multiplier 314 such as a wavelength switch, operated as described above to multiply an input vector by a vector of weights given by a single row of the weight matrix J. Signals generated by each channel are directed by a 1-to-N splitter to the vector-by-vector multiplier at all other channels.

However, in the second architecture, a global vector-by-matrix multiplier (VMM) may be implemented, wherein the channels of the solver each provide their modelling signal $x_i$ to the VMM to form an input vector, the matrix in full being implemented in this VMM. The solver architecture shown in FIG. 1 corresponds to this architecture where the interaction logic 104 of each channel is implemented at least in part by a respective subset of the elements (e.g. a row in the example shown) of the global vector-by-matrix multiplier, rather than by a separate individual multiplier for each channel. In embodiments, these elements may be integrated into the same SLM plate (e.g. same piece of glass or plastic) at different pixel positions.

An example WSS architecture is now described which extends the architecture of the WSS vector-by-vector multiplier to carry out vector-by-matrix operations. This architecture has the advantage of being capable of processing many more spins simultaneously than the vector-by-vector WSS described above.

Figure 9:
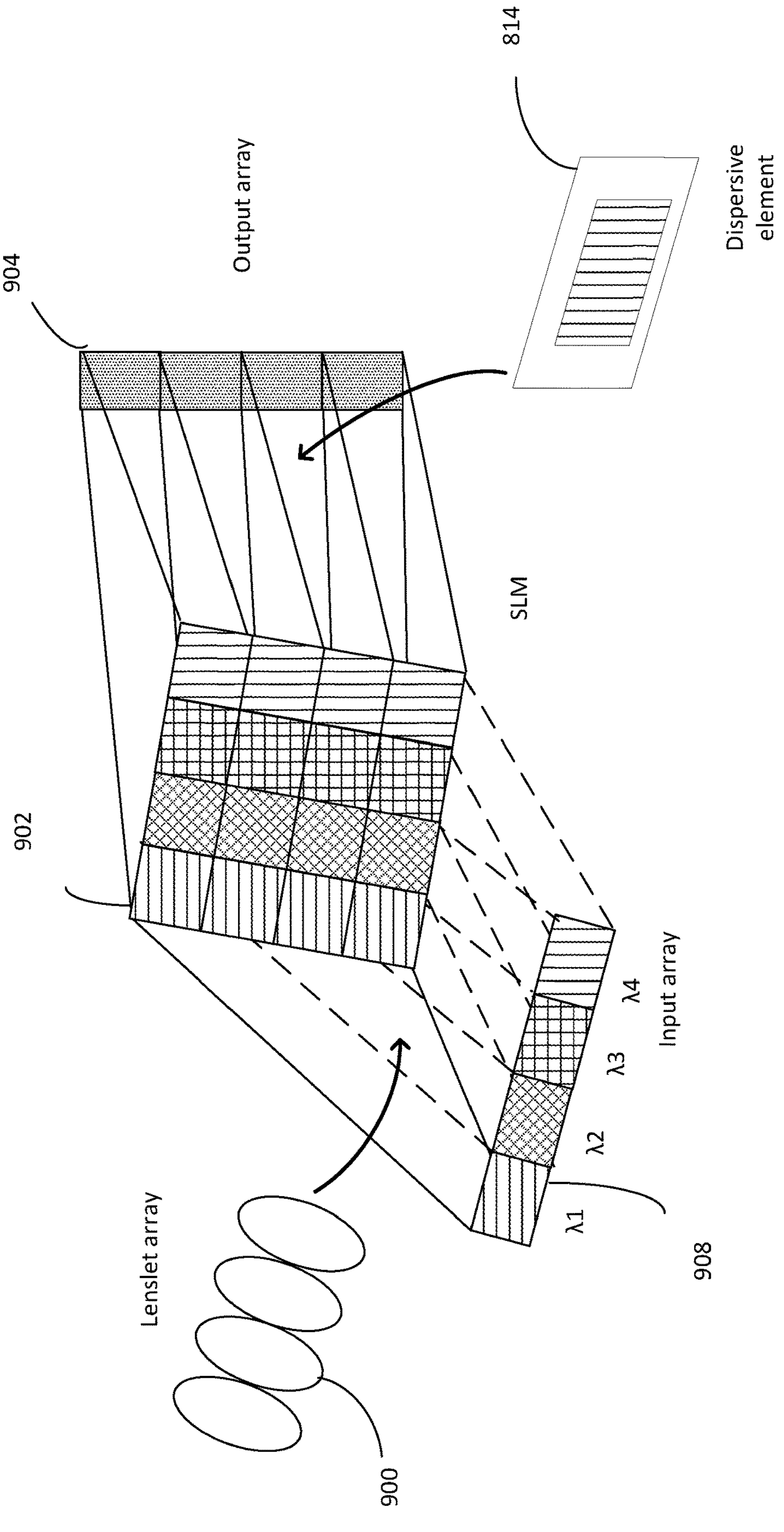
FIG. 9 shows the operation of a modified wavelength selective switch architecture to carry out optical vector-by-matrix multiplication.

FIG. 9 shows an example wavelength-selective switch configuration for computing vector-by-matrix multiplication, which may be used to implement the second solver architecture. This wavelength selective switch comprises an input array 908 of light sources generating a set of signals of different wavelengths, a lenslet array 900, a modified SLM 902, a dispersion element 814 (e.g. diffraction element) and an output array of light signals which are detected at an array of photodetectors, not shown in FIG. 9.

To use a spatial light modulator for vector-by-matrix multiplication in this example solver architecture, the vertical axis of the SLM needs to provide different weights even for the same wavelength, so that the whole functionality of the vector-by-matrix multiplication is achieved. This is because, for matrix multiplication, the input vector needs to be multiplied by each row of the matrix Q to generate the full output vector. The SLM 908 is a modified version of that shown in FIG. 8, wherein an array of modulators is arranged in an array, with the losses applied by each modulator reflecting the weights of the matrix to be applied to the input, i.e. a row of the modified SLM encodes the weights in a row of the matrix J. As described above, each channel computes an output comprising the vector multiplication of the input signals with a single row of the matrix J. Thus, each of the input signals needs to be processed to be spread out vertically such that they hit each row of the SLM 902, corresponding to a series of vector-by-vector multiplications.

In the example solver architecture with a global VMM, a single input array 908 comprises the modelling signals $x_i$ generated at each channel. This vector is passed through a lenslet array 900 having a particular geometry that causes the signals to spread out vertically, while collimating the beam in the horizontal direction of the SLM 902 corresponding to that signal's wavelength. This allows more input signals of different wavelengths to be processed at a single SLM. Moving from a single lens as in FIG. 8, to a lenslet array as in FIG. 9, enables scaling to more wavelengths. A lenslet array improves the collimation properties of the beam in both directions.

Note that in the architecture of FIG. 9, the 1-to-N splitter 106 of FIG. 2 is implemented by the vertical spreading of the input signals over the rows of the SLM, each corresponding to the spin interaction terms for a different channel.

The SLM 902 comprises a 2D array of modulators, each element of the array applying a respective weight to the received input signal, in contrast with the SLM described for the vector-by-vector multiplier in FIG. 8, which does not require elements in the same 'column' but different vertical positions to have different values. Each weighted signal at a particular wavelength, but modulated with a different weight, i.e. each signal of a column of the SLM 902, needs to bounce off the dispersive element 814 at a different vertical position to guarantee that the combination of the WDM signals occurs at the right photodetector in the photodetector array 904. The dispersive element may be implemented as a diffraction element such as a diffraction grating or prism.

In embodiments, the output signals may be directed from the element 814 via one or more lenses, to direct the signals into a beam at the correct vertical height to be detected using incoherent addition at the photodetector corresponding to the output vector element represented by that beam. E.g. another lenslet array may also be included between the dispersive element 814 and the multiple channels (potentially fibers) at the end of the system.

The photodetector array 904 is arranged as a set of photodetectors in a vertical array, each combined signal directed from the dispersive element 814 corresponding with the output signal for a different channel.

A solver which uses a vector-by-matrix multiplier architecture described above allows simultaneous processing of the interaction of spins for all channels using a single hardware arrangement such as the one shown in FIG. 9, while the use of a lenslet array to collimate the input. This may be further scaled to enable even larger numbers of inputs by splitting each beam into multiple beams which are directed to a configuration of multiple SLMs 902.

While optical vector multiplication has also been implemented by a number of existing technologies, such as spatial light modulators which do not use wavelength division multiplexing, ring resonators, and Mach Zehnder interferometers. Such technologies are described in detail for example in K. Kitayama et al, "Novel frontier of photonics for data processing-Photonic accelerator", APL Photonics 2019, https://doi.org/10.1063/1.5108912, which is incorporated herein by reference in its entirety. The wavelength-selective switch implementation combines the spatial modulation of SLMs with the wavelength division of ring resonators, but where a ring resonator implementation requires the input signal to be passed through a series of ring resonators, the SLM only requires each signal to be passed through a single modulator, which is an advantage in terms of system losses. SLM VMM implementations do not use wavelength division, and instead use a single optical source, and use coherent addition at the photodetectors to compute the weighted sum for each element of the output array. The wavelength selective switch combines the advantages of both these techniques.

While the above description of wavelength-selective switches refers to its implementation in a solver architecture such as that described herein. However, vector-by-matrix multiplication has many applications, particularly in machine learning, for example to apply weights of a neural network to input vectors. The wavelength selective switch described herein may be used in such applications. Similarly, the wavelength selective switch VMM may be applied to other solver architectures, such as the time-division multiplexing architecture shown in FIG. 5A.

The techniques disclosed herein can be applied to a wide range of applications, in particular the solver implementation disclosed herein can be used to solve any NP-hard problems for which a known transformation to the Ising formulation exists. A well-known example of such problems is the Travelling Salesman problem. This may be also be used for problems in other fields, for example, in determining molecular similarity, for which work has been done to find a transformation of a graph similarity problem of graphical representations of molecules into a QUBO formulation. This work is described in Hernandez, Maritza, et al. "A quantum-inspired method for three-dimensional ligand-based virtual screening." Journal of Chemical Information and Modeling 59.10 (2019): 4475-4485.

It will be appreciated that the above embodiments have been described by way of example. Other variants and applications of the disclosed techniques may become apparent to a person skilled in the art once given the disclosure of the concepts herein.

More generally, according to one aspect disclosed herein, there is provided apparatus for performing vector-by-vector multiplication in an optical domain, the apparatus comprising: a plurality of light signal generators, each arranged to emit a respective beam of light having a different respective carrier wavelength modulated with a respective input signal modelling a respective variable of a vector of variables;

a. one or more sets of light modulator elements, wherein within each set, each light modulator element in the set is arranged to receive the beam of light modulated with a different corresponding one of said input signals, and apply a corresponding weight from a vector of weights in order to produce a corresponding weighted optical signal;
b. a respective photosensor element for each of said sets; and
c. one or more optical combining elements arranged, for each of said sets, to direct the weighted optical signals of the set onto the respective photosensor element and thereby produce a respective output in the form of an analogue electronic signal summing the weighted optical signals of the respective set.

In embodiments, the one or more optical combiner elements comprise one or both of: a diffraction element, and/or a lenslet array.

In embodiments, each of the light signal generators comprises a laser, the light beams being laser beams.

In embodiments, the apparatus is for performing vector-by-matrix multiplication, wherein: the apparatus comprises a plurality of said sets of light modulator elements; and the apparatus comprises one or more optical splitter elements arranged to split each of said beams of light so as to direct the respective optical signal to the corresponding light modulator element in each set, each set of light modulator elements modelling a different vector of weights from a matrix of weights.

In embodiments, the spatial light modulator elements are incorporated in a same plate of the spatial light modulator.

In embodiments, the spatial light modulator elements are arranged in a 2D array.

In embodiments, each set of light modulator elements is arranged in a respective row of the 2D array, and different light modulator elements within each set correspond to different columns of the 2D array, or vice versa.

In embodiments, the one or more optical splitter elements comprise a lenslet array.

In embodiments, the apparatus is configured to optimize a function comprising a weighted sum of a plurality of terms, each term comprising a product of a corresponding subset of the variables from said vector of variables, and each term being weighted by a corresponding weight from the matrix of weights which models interactions between the variables; wherein the apparatus is arranged into a plurality of channels, each channel comprising: a respective one of the light signal generators, a respective one of the sets of light modulator elements, and a respective one of the photosensor elements; wherein the output from the respective photo sensor element of each channel represents a respective contribution of the respective variable to a Hamiltonian of the function; and wherein each channel further comprises a feedback path arranged to return a feedback based on the respective output back to the respective light signal generator, and the respective light signal generator is configured to adapt the respective input signal in dependence on the respective feedback signal, the light signal generators being configured to perform said adaptation such that the apparatus tends towards a state in which the energy of the Hamiltonian is minimized.

In embodiments said function comprises an Ising problem.

In embodiments, said function comprises a QUBO problem.

In embodiments, the feedback path is arranged to introduce a noise component into the respective feedback signal before returning it to the respective light signal generator.

In embodiments, each set of light modulator elements is arranged to perform a respective vector-by-vector multiplication of a respective node in an artificial neural network, or the apparatus is arranged to perform a vector-by-matrix multiplication of a layer in an artificial neural network.

In embodiments, the respective input signal is modulated into each beam of light using amplitude modulation, and each photodetector element is arranged to produce its respective output signal by incoherent detection.

Another aspect disclosed herein provides a method for performing vector-by-vector multiplication in an optical domain, the method comprising: generating, by a plurality of light sources, a plurality of beams of light, each having a different respective carrier wavelength modulated with a respective input signal modelling a respective variable of a vector of variables; receiving each beam of light at one or more sets of light modulator elements; and for each set of light modulator elements: applying a weight from a vector of weights to each beam of light by a respective light modulator element to produce a respective weighted optical signal; and directing, by one or more optical combining elements, the weighted optical signal onto a respective photosensor element thereby producing a respective output in the form of an analogue electronic signal summing the weighted optical signals of the respective set.

In embodiments the method may further comprise steps in accordance with any of the system features disclosed herein.

The invention claimed is:

1. An apparatus for performing vector-by-vector multiplication in an optical domain, the apparatus comprising:

a plurality of light signal generators, each arranged to emit a respective beam of light having a different respective carrier wavelength modulated with a respective input signal modelling a respective variable of a vector of variables;

one or more sets of light modulator elements, wherein within each set, each light modulator element in the set is arranged to receive the beam of light modulated with a different corresponding one of said input signals, and apply a corresponding weight from a vector of weights in order to produce a corresponding weighted optical signal;

a respective photosensor element for each of said sets; and one or more optical combining elements arranged, for each of said sets, to direct the weighted optical signals of the set onto the respective photosensor element and thereby produce a respective output in the form of an analogue electronic signal summing the weighted optical signals of the respective set, wherein the one or more optical combiner elements comprise one or both of: a diffraction element, an arrangement of one or more lenses.

2. The apparatus of claim 1, wherein each of the light signal generators comprises a laser, the light beams being laser beams.

3. The apparatus of claim 1, for performing vector-by-matrix multiplication, wherein:

the apparatus comprises a plurality of said sets of light modulator elements;

the apparatus comprises one or more optical splitter elements arranged to split each of said beams of light so as to direct the respective optical signal to the corresponding light modulator element in each set, each set of light modulator elements modelling a different vector of weights from a matrix of weights.

4. The apparatus of claim 3, wherein the light modulator elements are incorporated in a same plate of the light modulator.

5. The apparatus of claim 4, wherein the light modulator elements are arranged in a 2D array.

6. The apparatus of claim 5, wherein each set of light modulator elements is arranged in a respective row of the 2D array, and different light modulator elements within each set correspond to different columns of the 2D array, or vice versa.

7. The apparatus of claim 3, wherein the one or more optical splitter elements comprise a lenslet array.

8. The apparatus of claim 3, configured to optimize a function comprising a weighted sum of a plurality of terms, each term comprising a product of a corresponding subset of the variables from said vector of variables, and each term being weighted by a corresponding weight from the matrix of weights which models interactions between the variables; wherein the apparatus is arranged into a plurality of channels, each channel comprising:

a respective one of the light signal generators, a respective one of the sets of light modulator elements, and a respective one of the photosensor elements;

wherein the output from the respective photo sensor element of each channel represents a respective contribution of the respective variable to a Hamiltonian of the function; and wherein each channel further comprises a feedback path arranged to return a feedback based on the respective output back to the respective light signal generator, and the respective light signal generator is configured to adapt the respective input signal in dependence on the respective feedback signal, the light signal generators being configured to perform said adaptation such that the apparatus tends towards a state in which energy of the Hamiltonian is minimized.

9. The apparatus of claim 8, wherein said function comprises an Ising problem.

10. The apparatus of claim 8, wherein said function comprises a QUBO problem.

11. The apparatus of claim 8, wherein each feedback path is arranged to introduce a noise component into the respective feedback signal before returning it to the respective light signal generator.

12. The apparatus of claim 1, wherein each set of light modulator elements is arranged to perform a respective vector-by-vector multiplication of a respective node in an artificial neural network, or the apparatus is arranged to perform a vector-by-matrix multiplication of a layer in an artificial neural network.

13. The apparatus of claim 1, wherein the respective input signal is modulated into each beam of light using amplitude modulation, and each photodetector element is arranged to produce its respective output signal by incoherent detection.

14. A method for performing vector-by-vector multiplication in an optical domain, the method comprising:

generating, by a plurality of light sources, a plurality of beams of light, each having a different respective carrier wavelength modulated with a respective input signal modelling a respective variable of a vector of variables;

receiving each beam of light at one or more sets of light modulator elements; and by each set of light modulator elements:

applying a weight from a vector of weights to each beam of light by a respective light modulator element to produce a respective weighted optical signal; and directing, by one or more optical combining elements, the weighted optical signal onto a respective photosensor element thereby producing a respective output in the form of an analogue electronic signal summing the weighted optical signals of the respective set, the one or more optical combiner elements comprising one or both of:

a diffraction element, an arrangement of one or more lenses.

* * * * *